(12) United States Patent
Chung et al.

(10) Patent No.: US 8,848,643 B2
(45) Date of Patent: Sep. 30, 2014

(54) METHOD AND APPARATUS FOR TRANSMITTING UPLINK CONTROL INFORMATION IN WIRELESS COMMUNICATION SYSTEM FOR SUPPORTING MULTI-CARRIERS

(75) Inventors: Jae Hoon Chung, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 13/513,427

(22) PCT Filed: Jan. 10, 2011

(86) PCT No.: PCT/KR2011/000135
§ 371 (c)(1),
(2), (4) Date: Jun. 1, 2012

(87) PCT Pub. No.: WO2011/084020
PCT Pub. Date: Jul. 14, 2011

(65) Prior Publication Data
US 2012/0243497 A1 Sep. 27, 2012

Related U.S. Application Data

(60) Provisional application No. 61/293,214, filed on Jan. 8, 2010.

(51) Int. Cl.
*H04W 4/00* (2009.01)
*H04L 1/00* (2006.01)
(Continued)

(52) U.S. Cl.
CPC .............. *H04W 72/00* (2013.01); *H04W 28/26* (2013.01); *H04L 1/0031* (2013.01); *H04W 72/1289* (2013.01); *H04W 72/02* (2013.01); *H04L 1/1861* (2013.01); *H04L 5/0055* (2013.01); *H04L 1/0026* (2013.01)
USPC ............ 370/329; 370/338; 370/341; 370/348

(58) Field of Classification Search
CPC .................................................. H04W 72/00

USPC ............ 370/329, 330, 341, 348, 338; 455/68
See application file for complete search history.

(56) References Cited

U.S. PATENT DOCUMENTS

2007/0047493 A1  3/2007  Park et al.
2008/0254800 A1  10/2008  Chun et al.
(Continued)

FOREIGN PATENT DOCUMENTS

CN  101300753 A  11/2008
CN  101502158 A  8/2009

OTHER PUBLICATIONS

Huawei, "PUCCH design for carrier aggregation", 3GPP TSG RAN WG1#55bis, Agenda 12.2, Ljubljana, Slovenia, Jan. 12-16, 2009, 8 pages, R1-090126.

(Continued)

*Primary Examiner* — Brian D Nguyen
*Assistant Examiner* — Toan Nguyen
(74) *Attorney, Agent, or Firm* — Birch, Stewart, Kolasch & Birch, LLP

(57) ABSTRACT

The present invention relates to a method for transmitting the uplink control information in the wireless communication system supporting the multi-carriers according to one embodiment of the present invention, which comprises the steps of: reserving one or more channel selection resources for transmitting the uplink control information; receiving scheduling information for one or more uplink data channels to be transmitted on the same time domain resources as the reserved channel selection resources; determining an uplink data channel in which the uplink control information is multiplexed, from one or more uplink data channels; and multiplexing and transmitting the uplink control information in each of one or more resource element regions corresponding to each of one or more channel selection resources which are reserved to transmit the uplink control information, on the selected one uplink data channel.

10 Claims, 19 Drawing Sheets

(51) Int. Cl.
  *H04W 72/00* (2009.01)
  *H04L 1/18* (2006.01)
  *H04L 5/00* (2006.01)
  *H04W 28/26* (2009.01)
  *H04W 72/12* (2009.01)
  *H04W 72/02* (2009.01)

(56) References Cited

U.S. PATENT DOCUMENTS

| | | |
|---|---|---|
| 2009/0047912 A1 | 2/2009 | Lee et al. |
| 2009/0073922 A1 | 3/2009 | Malladi et al. |
| 2009/0196249 A1 * | 8/2009 | Kawamura et al. ........... 370/330 |
| 2009/0199055 A1 | 8/2009 | Chen et al. |
| 2009/0203323 A1 * | 8/2009 | Ratasuk et al. ................ 455/68 |
| 2009/0316811 A1 | 12/2009 | Maeda et al. |
| 2010/0098012 A1 * | 4/2010 | Bala et al. ..................... 370/329 |
| 2010/0150085 A1 * | 6/2010 | Ishii et al. ..................... 370/329 |
| 2010/0165931 A1 * | 7/2010 | Nimbalker et al. ........... 370/329 |

OTHER PUBLICATIONS

LG Electronics, "UE-specific Carrier Assignment for LTE-Advanced", 3GPP TSG RAN WG1 Meeting #57, Agenda Item 15.4, San Francisco, USA, May 4-8, 2009, 4 pages, R1-092126.

* cited by examiner

FIG. 5
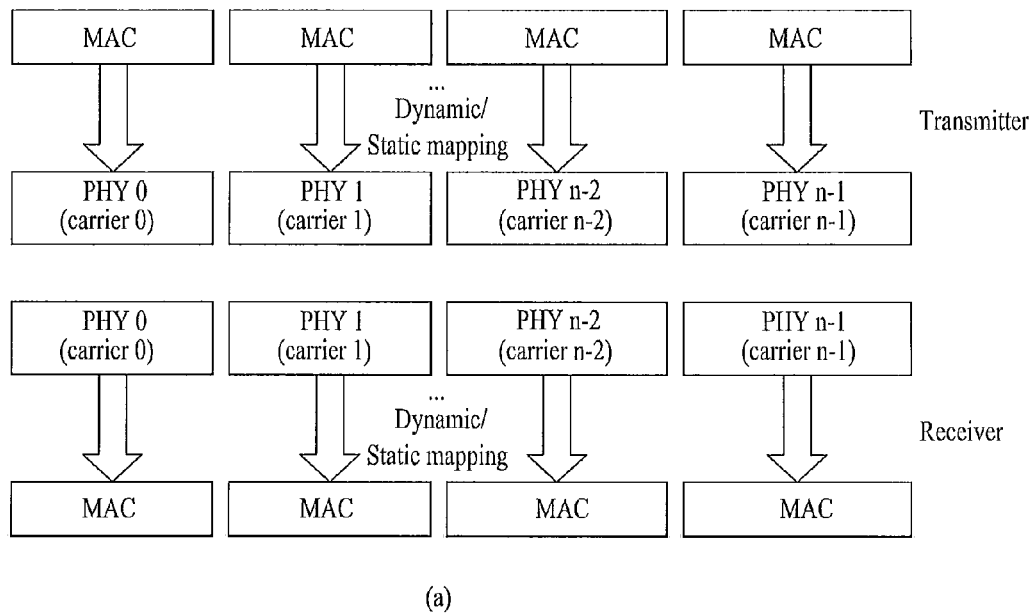
(a)
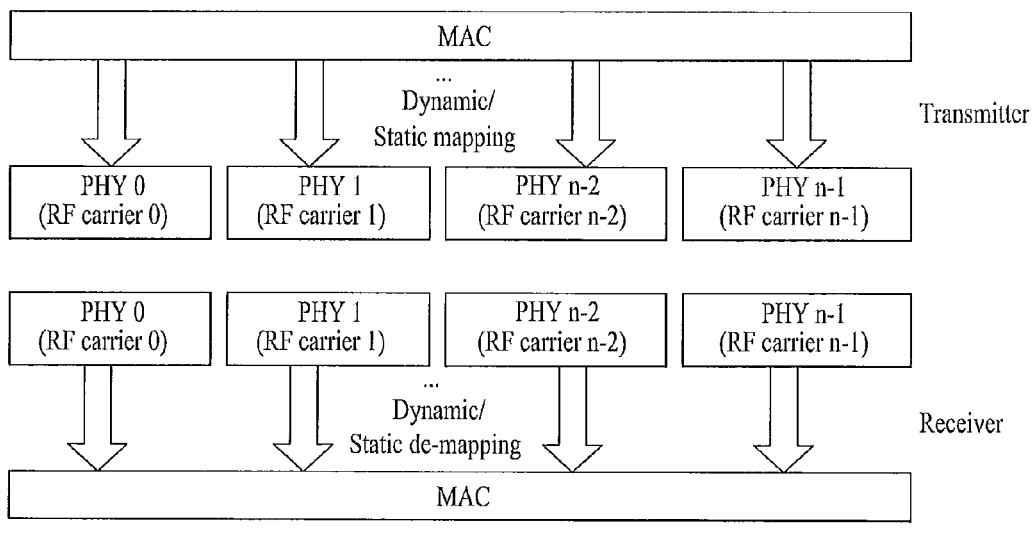
(b)

FIG. 6

$n_{PRB} = N_{RB}^{UL} - 1$

| CQI | CQI |
|---|---|
| CQI+A/N | A/N |
| | A/N |
| | |
| DATA ||
| | |

|  |  |
|---|---|
| | |
| DATA ||
| | |
| A/N | |
| A/N | CQI+A/N |
| CQI | CQI |

$n_{PRB} = 0$

One subframe

FIG. 9
(a) 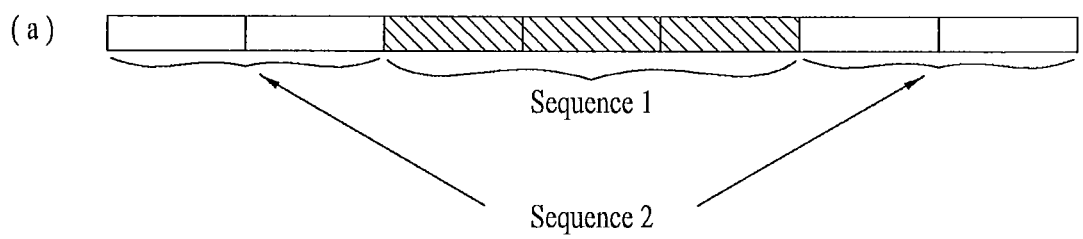
(b) 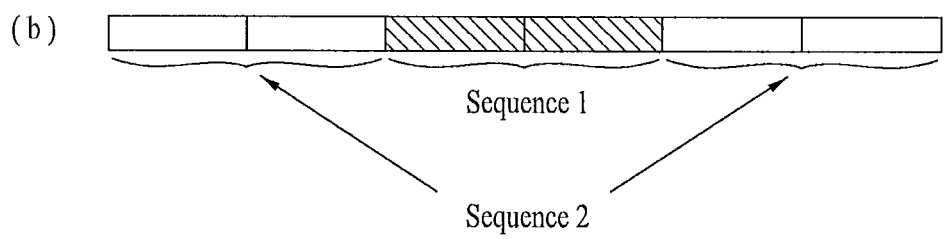

FIG. 13
DL 
UL 

METHOD AND APPARATUS FOR TRANSMITTING UPLINK CONTROL INFORMATION IN WIRELESS COMMUNICATION SYSTEM FOR SUPPORTING MULTI-CARRIERS

CROSS REFERENCE TO RELATED APPLICATIONS

This application is the National Phase of PCT/KR2011/000135 filed on Jan. 10, 2011, which claims priority under 35 U.S.C. 119(e) to U.S. Provisional Application No. 61/293,214 filed on Jan. 8, 2010, all of which are hereby expressly incorporated by reference into the present application.

TECHNICAL FIELD

The present invention relates to a wireless communication system, and more particularly, to a method and apparatus for transmitting uplink control information in a wireless communication system supporting multiple carriers.

BACKGROUND ART

Multiple carrier technology may be called carrier aggregation technology. Unlike a conventional general wireless communication system using only one carrier in uplink (UL) and downlink (DL), multiple carrier technology produces an effect as if a frequency bandwidth of a broadband is logically used by physically aggregating a plurality of carriers in the frequency domain in order to support an extended bandwidth.

Meanwhile, uplink control information includes scheduling request, acknowledgement or negative acknowledgement (ACK/NACK) for UL transmission, and UL channel status information. In a conventional single carrier system, the uplink control information is basically transmitted through an uplink control channel. Alternatively, if there is transmission over an uplink data channel in a circumstance in which the uplink control information should be transmitted, the uplink control information may be transmitted through the uplink data channel.

DETAILED DESCRIPTION OF THE INVENTION

Technical Problems

In a conventional single carrier system, only one UL carrier for transmitting the UL control information is present, whereas, in a multiple carrier system, a detailed method for configuring a UL carrier for transmitting the UL control information and configuring a UL channel is needed.

It is a technical object of the present invention to provide a method and apparatus for transmitting UL control information in a wireless communication system supporting multiple carriers. Especially, it is a technical object of the present invention to provide a method and apparatus for transmitting UL control information by piggybacking the UL control information on a UL data channel (e.g. a Physical Uplink Shared Channel (PUSCH)) in a wireless communication system supporting multiple carriers.

It will be appreciated by persons skilled in the art that that the technical objects that can be achieved through the present invention are not limited to what has been particularly described hereinabove and other technical objects of the present invention will be more clearly understood from the following detailed description.

Technical Solutions

To achieve the above technical object, a method for transmitting uplink control information in a wireless communication system supporting multiple carriers according to an embodiment of the present invention includes reserving one or more channel selection resources for transmission of the uplink control information; receiving scheduling information for one or more uplink data channels, wherein the one or more uplink data channels are scheduled to be transmitted in the same time domain resources as the reserved channel selection resources; determining one uplink data channel on which the uplink control information is multiplexed, among the one or more uplink data channels; and multiplexing the uplink control information in one or more resource element regions corresponding respectively to the one or more channel selection resources reserved for transmission of the uplink control information, on the determined one uplink data channel, and transmitting the multiplexed uplink control information.

The one uplink data channel on which the uplink control information is multiplexed may be determined by higher layer signaling or may be determined based on an index of an uplink carrier on which the one or more uplink data channels are scheduled.

The one or more reserved channel selection resources may be determined by higher layer signaling or may be determined based on a control channel element index of a Physical Downlink Control Channel (PDCCH).

The method transmitting uplink control information may further include puncturing one or more resource element regions corresponding respectively to the one or more channel selection resources reserved for transmission of the uplink control information on the one uplink data channel on which the uplink control information is multiplexed.

The uplink control information may be mapped to the punctured resource element regions.

A sequence indicating that the uplink control information is not transmitted may be mapped to the punctured resource element regions.

The uplink control information may be Acknowledgement/Negative Acknowledgement (ACK/NACK) information for one or more downlink data channels.

To achieve the above technical object, a method for receiving uplink control information in a wireless communication system supporting multiple carriers according to another embodiment of the present invention includes transmitting scheduling information for one or more uplink data channels; and receiving the uplink control information multiplexed on one uplink data channel among the one or more uplink data channels, wherein the uplink control information is multiplexed in resource element regions on the one uplink data channel, corresponding respectively to the one or more channel selection resources reserved for transmission of the uplink control information, and the one or more uplink data channels are scheduled in the same time domain resources as the one or more channel selection resources reserved for transmission of the uplink control information.

The one uplink data channel on which the uplink control information is multiplexed may be determined by higher layer signaling or may be determined based on an index of an uplink carrier on which the one or more uplink data channels are scheduled.

The one or more reserved channel selection resources may be determined by higher layer signaling or may be determined based on a control channel element index of a Physical Downlink Control Channel (PDCCH).

One or more resource element regions corresponding respectively to the one or more channel selection resources reserved for transmission of the uplink control information may be punctured on the one uplink data channel on which the uplink control information is multiplexed.

The uplink control information may be mapped to the punctured resource element regions.

A sequence indicating that the uplink control information is not transmitted may be mapped to the punctured resource element regions.

The uplink control information may be Acknowledgement/Negative Acknowledgement (ACK/NACK) information for one or more downlink data channels.

To achieve the above technical object, a user equipment for transmitting uplink control information in a wireless communication system supporting multiple carriers according to still another embodiment of the present invention includes a reception module for receiving a downlink signal; a transmission module for transmitting an uplink signal; and a processor connected to the reception module and the transmission module, for controlling operation of the user equipment, wherein the processor, reserves one or more channel selection resources for transmission of the uplink control information, receives, through the reception module, scheduling information for one or more uplink data channels, wherein the one or more uplink data channels are scheduled to be transmitted in the same time domain resources as the reserved channel selection resources, determines one uplink data channel on which the uplink control information is multiplexed, among the one or more uplink data channels, and multiplexes the uplink control information in one or more resource element regions corresponding respectively to the one or more channel selection resources reserved for transmission of the uplink control information, on the determined one uplink data channel, and transmits the multiplexed uplink control information through the transmission module.

To achieve the above technical object, a base station for receiving uplink control information in a wireless communication system supporting multiple carriers according to a further embodiment of the present invention includes a reception module for receiving an uplink signal; a transmission module for transmitting a downlink signal; and a processor connected to the reception module and the transmission module, for controlling operation of the base station, wherein the processor transmits scheduling information for one or more uplink data channels through the transmission module, and receives the uplink control information multiplexed on one uplink data channel among the one or more uplink data channels through the reception module, wherein the uplink control information is multiplexed in resource element regions on the one uplink data channel, corresponding respectively to the one or more channel selection resources reserved for transmission of the uplink control information, and wherein the one or more uplink data channels are scheduled in the same time domain resources as the channel selection resources reserved for transmission of the uplink control information.

The above-described general description of the present invention and a detailed description thereof are exemplary and are for additional description of the invention disclosed in the claims.

Advantageous Effects

According to the present invention, a method and apparatus for transmitting UL control information by effectively piggybacking the UL control information on a PUSCH in a wireless communication system supporting multiple carriers.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a diagram explaining the structure of a physical layer (L1) and a MAC layer (L2) of a multi-carrier support system.

FIG. 6 is a diagram illustrating a resource mapping structure of a PUCCH in a UL PRB.

FIG. 9 is a diagram illustrating the structure of an SR channel in one slot.

FIG. 13 is a diagram conceptually illustrating CCs for DL and UL.

BEST MODE FOR CARRYING OUT THE INVENTION

Figure 1:
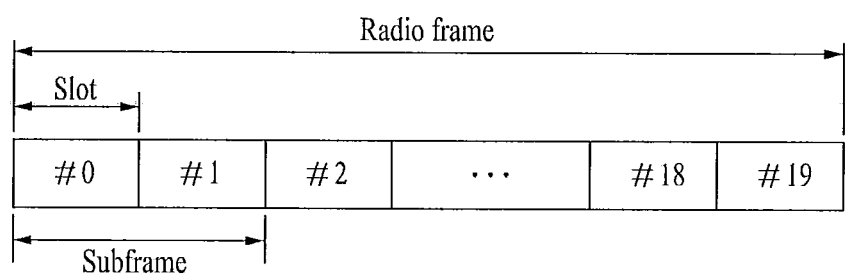
FIG. 1 is a diagram illustrating the structure of a radio frame used in a 3GPP LTE system.

The following embodiments are achieved by combination of structural elements and features of the present invention in a predetermined manner. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, embodiments of the present invention are described centering on a data transmission and reception relationship between a base station and a terminal. Here, the base station refers to a terminal node of a network communicating directly with the terminal. In this document, a specific operation described as being performed by the base station may be performed by an upper node of the base station in some cases.

In other words, it is apparent that, in a network comprised of a plurality of network nodes including a base station, various operations performed for communication with a terminal may be performed by the base station, or network nodes other than the base station. The term 'Base Station (BS)' may be replaced with terms such as fixed station, Node B, eNode B (eNB), and Access Point (AP). The term 'relay' may be replaced with the terms Relay Node (RN) and Relay Station (RS). Also, the term 'terminal' may be replaced with terms such as User Equipment (UE), Mobile Station (MS), Mobile Subscriber Station (MSS), and Subscriber Station (SS).

Specific terms disclosed in the present invention are proposed to aid in understanding of the present invention, and the use of these specific terms may be changed to another format within the technical scope or spirit of the present invention.

In some instances, well-known structures and devices may be omitted in order to avoid obscuring the concepts of the present invention and the important functions of the structures and devices may be shown in block diagram form. The same reference numbers will be used throughout the drawings to refer to the same or like parts.

Embodiments of the present invention are supported by standard documents disclosed in at least one of wireless access systems including an Institute of Electrical and Electronics Engineers (IEEE) 802 system, a $3^{rd}$ Generation Partnership Project (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by the above-mentioned documents.

The following technique can be used for a variety of radio access systems, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as Institute of Electrical and Electronics Engineers (IEEE) 802.11 (Wi-Fi), IEEE 802.16 (WiMax), IEEE 802-20, and E-UTRA (Evolved UTRA). UTRA is a part of the Universal Mobile Telecommunications System (UMTS). 3GPP LTE is a part of E-UMTS (Evolved UMTS), which uses E-UTRA. 3GPP LTE employs OFDMA in DL and employs SC-FDMA in UL. LTE-A is an evolved version of 3GPP LTE. WiMax can be explained by IEEE 802.16e (WirelessMAN-OFDMA Reference System) and advanced IEEE 802.16m (WirelessMAN-OFDMA Advanced System). For clarity, the following description focuses on the 3GPP LTE and LTE-A systems. However, technical features of the present invention are not limited thereto.

FIG. 1 is a diagram illustrating the structure of a radio frame used in a 3GPP LTE system. One radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in the time domain. Since the 3GPP LTE system uses an OFDMA scheme in DL, the OFDM symbol indicates one symbol period. One symbol may be called an SC-FDMA symbol or a symbol period in UL. A Resource Block (RB) is a resource allocation unit and includes a plurality of contiguous subcarriers in one slot. The structure of the radio frame is only exemplary. Accordingly, the number of subframes included in one radio frame, the number of slots included in one subframe or the number of OFDM symbols included in one slot may be changed in various manners.

Figure 2:
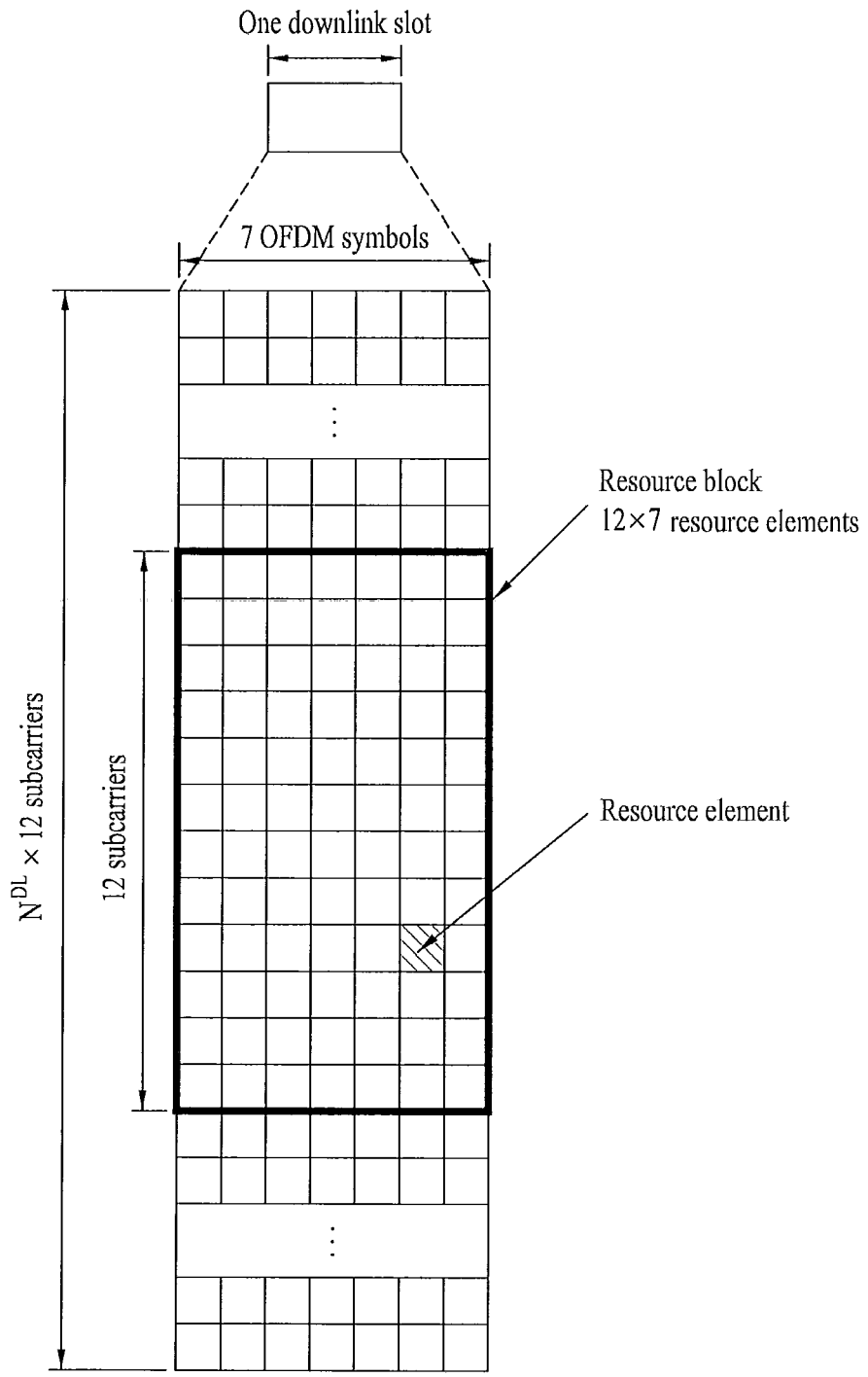
FIG. 2 is a diagram illustrating a resource grid in a DL slot.

FIG. 2 is a diagram illustrating a resource grid in a DL slot. Although one DL slot includes 7 OFDM symbols in the time domain and one RB includes 12 subcarriers in the frequency domain in the figure, the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a Resource Element (RE). One RB includes 12×7 REs. The number $N^{DL}$ of RBs included in the DL slot is determined based on a DL transmission bandwidth. The structure of a UL slot may be equal to the structure of the DL slot.

Figure 3:
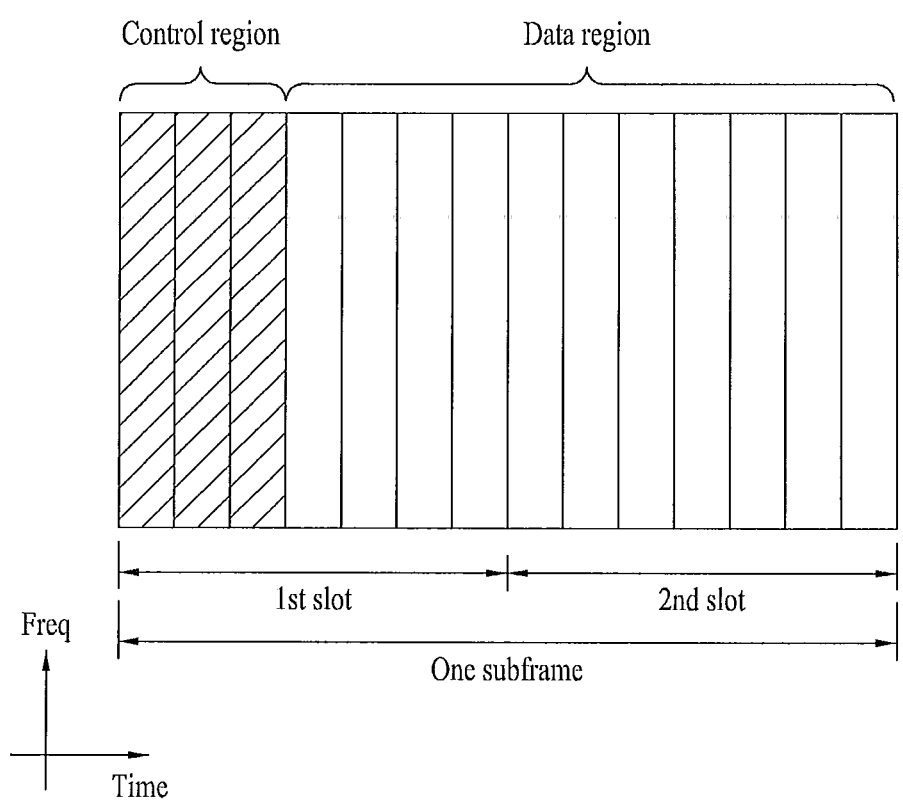
FIG. 3 is a diagram illustrating the structure of a DL subframe.

FIG. 3 is a diagram illustrating the structure of a DL subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the DL control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to UL transmission. Control information transmitted through the PDCCH is referred to as Downlink Control Information (DCI). The DCI includes UL or DL scheduling information or a UL transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a random access response transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregate of one or more contiguous Control Channel Elements (CCEs).

The CCE is a logical allocation unit used to provide the PDCCHs at a coding rate based on the state of a radio channel. The CCE corresponds to a plurality of RE groups and may correspond to 36 subcarriers for example. The format of the PDCCH and the number of available bits are determined based on a correlation between the number of CCEs and the coding rate provided by the CCEs. An eNB determines a PDCCH format according to a DCI transmitted to a UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a System Information Block (SIB)), a system information identifier and a System Information RNTI (SI-RNTI) may be masked to the CRC. To indicate a random access response that is a response to transmission of a random access preamble of the UE, a Random Access-RNTI (RA-RNTI) may be masked to the CRC.

Figure 4:
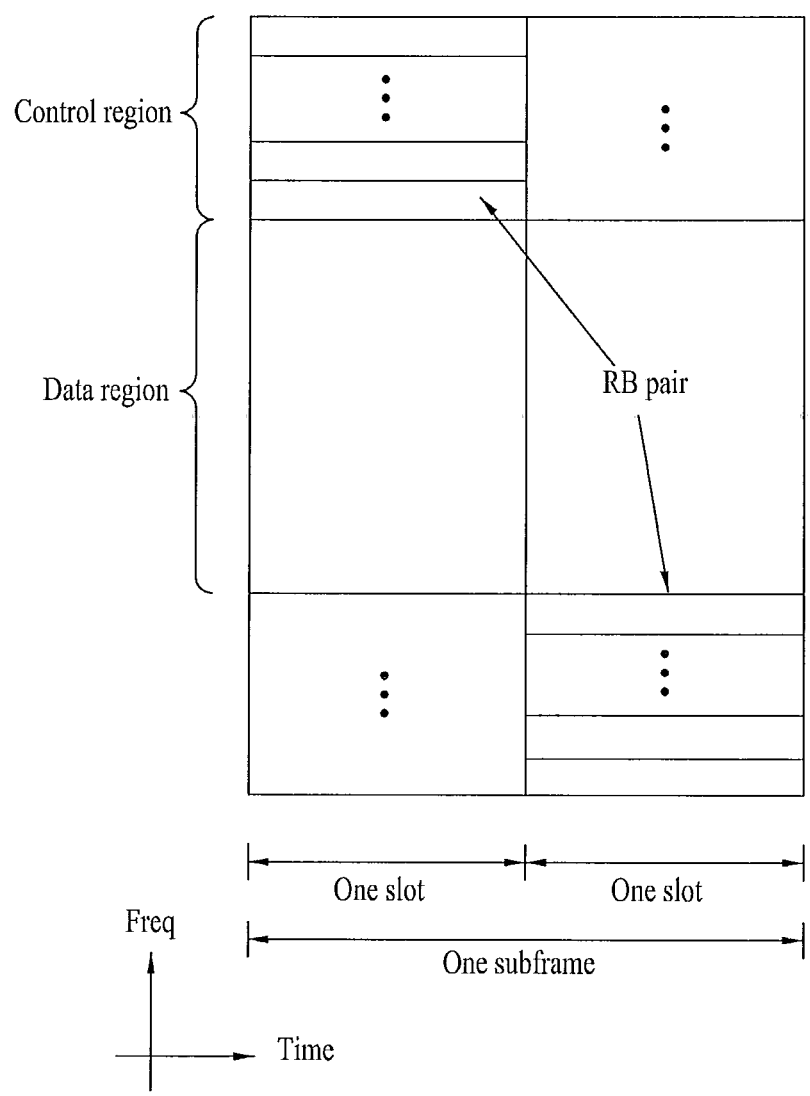
FIG. 4 is a diagram illustrating the structure of a UL subframe.

FIG. 4 is a diagram illustrating the structure of a UL subframe. The UL subframe may be divided into a control region and a data region in the frequency domain. A Physical Uplink Control Channel (PUCCH) including UL control information is allocated to the control region. A Physical uplink Shared Channel (PUSCH) including user data is allocated to the data region. In order to maintain a single carrier property, one UE does not concurrently transmit the PUCCH and the PUSCH. The PUCCH for one UE is allocated to a RB pair in a subframe. RBs belonging to the RB pair occupy different subcarriers with respect to two slots. This is called that an RB pair allocated to the PUCCH is frequency-hopped at a slot boundary.

Carrier Aggregation

Hereinafter, Carrier Aggregation (CA) technology will be described. CA, introduction of which is considered in an advanced OFDM based mobile communication system, refers to technology for causing a DL transmission entity (BS (cell) or RN) or a UL transmission entity (UE or RN) to concurrently transmit data or control information through one or more carriers to DL and UL, respectively, in carriers (they may be expressed as a component carrier or carrier band and, in this invention, are referred to as carriers) which are individually designated with respect to DL or UL. In the following description, an uplink component carrier is briefly expressed as a UL CC and a downlink component carrier is briefly expressed as a DL CC.

Moreover, in the following description, although an eNB (or a cell) is mainly described as an example of a DL transmission entity and a UE is mainly described as an example of a UL transmission entity, the present invention is not limited thereto. Namely, disclosure of the present invention may be identically applied even though an RN is a DL transmission entity to the UE or a UL reception entity from the UE or the RN is a UL transmission entity to the eNB or a DL reception entity from the eNB.

DL CA may be explained as DL transmission support by an eNB to a UE using a frequency domain resource (subcarriers or Physical Resource Blocks (PRBs)) on one or more carrier bands in any time domain resource (a subframe unit). UL CA may be explained as UL transmission support by the UE to the eNB using a frequency domain resource (subcarriers or PRBs) on one or more carrier bands in any time domain resource (a subframe unit).

With reference to FIG. 5, the structure of a physical layer (first layer, L1) and a MAC layer (second layer, L2) of a multi-carrier support system is described. In an eNB of a conventional wireless communication system supporting a single carrier, one physical layer (PHY) entity supporting one carrier may be included and one Medium Access Control (MAC) entity for controlling one PHY entity may be provided. A baseband processing operation, for example, may be performed in the PHY. In the MAC layer, for example, an L1/L2 scheduler operation including a MAC protocol Data Unit (PDU) generator and a MAC/RLC sublayer of a transmitter may be performed. A MAC PDU packet block of the MAC layer is converted into a transport block through a logical transport layer and is mapped to a PHY input information block.

Meanwhile, in a multi-carrier support system, a plurality of MAC-PHY entities may be provided. Namely, as shown in FIG. 5(a), a transmitter and a receiver of the multi-carrier support system may be configured such that each of n CCs corresponds to one MAC-PHY entity. Since an independent PHY and MAC layer per CC are configured, a PDSCH per CC is generated in the PHY from the MAC PDU.

Alternatively, in the multi-carrier support system, one common MAC entity and a plurality of PHY entities may be provided. Namely, as shown in FIG. 5(b), the transmitter and receiver of the multi-carrier support system may be configured such that n PHY entities corresponding respectively to n CCs are provided and one common MAC entity for controlling the n PHY entities is provided. In this case, a MAC PDU derived from one MAC layer may be divided into a plurality of transport blocks corresponding respectively to a plurality of CCs on a transport layer. Alternatively, the MAC PDU may be divided into CCs during MAC PDU generation in the MAC layer or RLC PDU generation in the RLC layer. Thus, a PDSCH per CC is generated in the PHY.

A PDCCH which transmits control information of L1/L2 control signaling generated from a packet scheduler of the MAC layer may be mapped to a physical resource per individual CC and then transmitted. Here, the PDCCH including control information (DL allocation or UL grant) for PDSCH or PUSCH transmission for a specific UE may be separately encoded with respect to each CC through which corresponding PDSCH/PUSCH is transmitted. Such a PDCCH may be called a separate coded PDCCH. Meanwhile, control information for PDSCH/PUSCH transmission of plural CCs may be configured by one PDCCH and then transmitted, and such a PDCCH may be called joint coded PDCCH.

To support CA, a connection between an eNB and a UE (or RN) should be configured or preparation for connection configuration is needed, so as to transmit the control channel (PDCCH or PUCCH) and/or the shared channel (PDSCH or PUSCH). For such connection/connection configuration for a specific UE (or RN), measurement and/or reporting for carriers are needed and CCs for such measurement and/or reporting may be assigned. That is, CC assignment refers to configuring CCs (the number of CCs and index designation) used for DL/UL transmission among DL/UL CCS configured in the eNB in consideration of capabilities of a specific UE (or RN) and a system environment.

When third layer (L3) Radio Resource Management (RRM) controls CC assignment, UE-specific or RN-specific RRC signaling may be used. Alternatively, cell-specific or cell cluster-specific RRC signaling may be used. When dynamic control is necessary for CC assignment, a predetermined PDCCH may be used as L1/L2 control signaling, or a CC assignment control information dedicated physical control channel or a PDSCH of an L2 MAC message type may be used. Meanwhile, when a packet scheduler controls CC assignment, a predetermined PDCCH may be used as L1/L2 control control signaling, or a CC assignment control information dedicated physical control channel or a PDSCH of an L2 MAC message type may be used.

Physical Uplink Control Channel (PUCCH)

Hereinafter, a Physical Uplink Control Channel (PUCCH) including UL control information will be described in detail.

The PUCCH may be modulated using a Binary Phase Shift Keying (BPSK) and a Quadrature Phase Shift Keying (QPSK) scheme. Control information of a plurality of UEs may be transmitted through the PUCCH. If Code Division Multiplexing (CDM) is performed to distinguish between signals of the respective UEs, a length-12 Constant Amplitude Zero Autocorrelation (CAZAC) sequence is mainly used. Since the CAZAC sequence has a property of maintaining a constant amplitude in the time domain and frequency domain, it is suitable for increasing coverage by lowering a Peak-to-Average Power Ratio (PAPR) or Cubic Metric (CM). ACK/NACK information about DL data transmission, transmitted through the PUCCH, is covered using an orthogonal sequence.

Control information transmitted over the PUCCH may be distinguished using cyclically shifted sequences having different cyclic shift values. The cyclically shifted sequence may be generated by cyclically shifting a base sequence by a specific Cyclic Shift (CS) amount. The specific CS amount is indicated by a CS index. The number of available cyclic shifts may vary according to delay spread of a channel. A variety of types of sequences may be used as the base sequence and the above-mentioned CAZAC sequence is an example of the base sequence.

The PUCCH may include control information such as Scheduling Request (SR), DL channel measurement information, and ACK/NACK information about DL data transmission. The channel measurement information may include a Channel Quality Indicator (CQI), a Precoding Matrix Index (PMI), and a Rank Indicator (RI).

A PUCCH format is defined according to a type of control information included in the PUCCH, a modulation scheme, etc. In other words, PUCCH format 1 is used to transmit SR and PUCCH format 1a or format 1b is used to transmit HARQ ACK/NACK. PUCCH format 2 is used to transmit CQI and PUCCH formats 2a/2b are used to transmit CQI and HARQ ACK/NACK.

In any subframe, if HARQ ACK/NACK is transmitted alone, PUCCH format 1a or format 1b is used, and if SR is transmitted alone, PUCCH format 1 is used. The UE may transmit HARQ ACK/NACK and SR in the same subframe and this will be described later.

The PUCCH format may be summarized as shown in Table 1.

TABLE 1

| PUCCH format | Modulation scheme | Number of bits per subframe | Usage | Etc. |
| --- | --- | --- | --- | --- |
| 1 | N/A | N/A | SR (Scheduling Request) | |
| 1a | BPSK | 1 | ACK/NACK | One codeword |
| 1b | QPSK | 2 | ACK/NACK | Two codewords |
| 2 | QPSK | 20 | CQI | Joint coding ACK/NACK (extended CP) |
| 2a | QPSK + BPSK | 21 | CQI + ACK/NACK | Normal CP only |

TABLE 1-continued

| PUCCH format | Modulation scheme | Number of bits per subframe | Usage | Etc. |
| --- | --- | --- | --- | --- |
| 2b | QPSK + BPSK | 22 | CQI + ACK/NACK | Normal CP only |

FIG. 6 illustrates a resource mapping structure of a PUCCH in a UL PRB. uL denotes the number of RBs in UL and $n_{PRB}$ denotes a PRB number. A PUCCH is mapped to both edges of a UL frequency block. A CQI resource may be mapped to a PRB immediately after a frequency band edge, and ACK/NACK may be mapped to the next position.

Hereinafter, PUCCH formats will be described in detail.

Prior to description of PUCCH format 1, PUCCH formats 1a and 1b are described. PUCCH formats 1a/1b are control channels used for ACK/NACK transmission.

In PUCCH formats 1a/1b, a symbol modulated using a BPSK or QPSK modulation scheme is multiplied by a CAZAC sequence of length-12. After multiplication by the CAZAC sequence, the symbol is block-wise spread with an orthogonal sequence. A length-4 Hadamard sequence is used for general ACK/NACK information and a length-3 Discrete Fourier Transform (DFT) sequence is used for shortened ACK/NACK information and reference signals. For reference signals of an extended CP, a length-2 Hadamard sequence is used.

Figure 7:
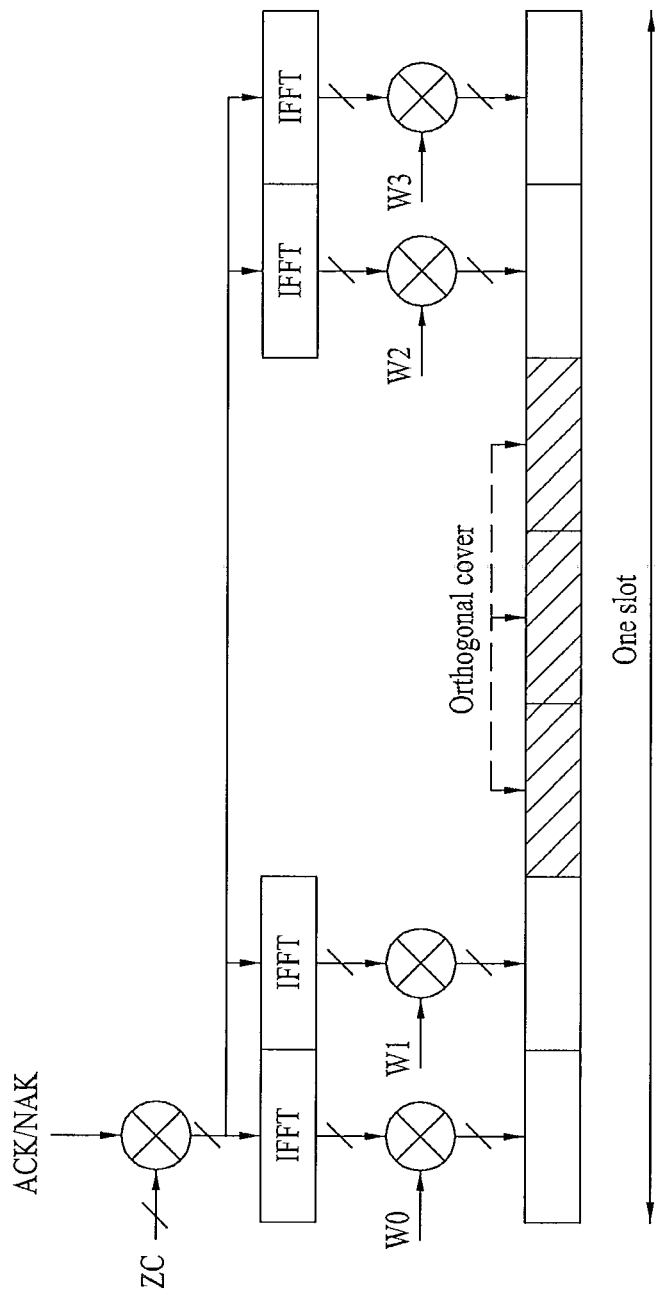
FIG. 7 is a diagram illustrating the structure of an ACK/NACK channel in a normal CP.

FIG. 7 illustrates the structure of an ACK/NACK channel in a normal CP. Reference Signals (RSs) are carried in three contiguous symbols in the middle part of 7 OFDM symbols included in one slot and ACK/NACK signals are carried in the other four OFDM symbols. The number and position of symbols used for the RSs may vary according to a control channel and the number and position of symbols used for ACK/NACK signals associated therewith may correspondingly vary. The possible number of ACK/NACK channels per RB is 12, 18, or 36 in a normal CP and is 8 or 12 in an extended CP.

When a control signal is transmitted in an assigned band, two-dimensional spreading is applied in order to raise multiplexing capacity. That is, frequency domain spread and time domain spread are simultaneously applied in order to increase the number of UEs or the number of control channels which can be multiplexed. To spread ACK/NACK signals in the frequency domain, a frequency domain sequence is used as a basic sequence. The frequency domain sequence may be a Zadoff-Chu (ZC) sequence which is one of CAZAC sequences. The ACK/NACK signals spread in the frequency domain are subject to Inverse Fast Fourier Transform (IFFT) and then are spread in the time domain using a time domain sequence. For example, the ACK/NACK signals may be spread using length-4 orthogonal sequences w0, w1, w2, and w3 with respect to four symbols. The RSs are spread using a length-3 orthogonal sequence. This is called orthogonal covering.

Examples of sequences used for spreading the ACK/NACK information are shown in Table 2 and Table 3. Table 2 shows a sequence for a length-4 symbol and Table 3 shows a sequence for a length-3 symbol. The sequence for the length-4 symbol is used for PUCCH formats 1/1a/1b of a general subframe configuration. In consideration of the case where a Sounding Reference Signal (SRS) is transmitted in the last symbol of the second slot in the subframe configuration, the sequence for the length-4 symbol may be applied to the first symbol and shortened PUCCH formats 1/1a/1b of the sequence for the length-3 symbol may be applied to the second slot.

TABLE 2

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

TABLE 3

| Sequence index | [w(0), w(1), w(2)] |
|---|---|
| 0 | [1 1 1] |
| 1 | $\left[1\ e^{\frac{j2\pi}{3}}\ e^{\frac{j4\pi}{3}}\right]$ |
| 2 | $\left[1\ e^{\frac{j4\pi}{3}}\ e^{\frac{j2\pi}{3}}\right]$ |

Meanwhile, an example of an orthogonal sequence used for RS spread of an ACK/NACK channel is shown in Table 4.

TABLE 4

| Sequence index | Normal CP | Extended CP |
|---|---|---|
| 0 | [1 1 1] | [1 1] |
| 1 | $\left[1\ e^{\frac{j2\pi}{3}}\ e^{\frac{j4\pi}{3}}\right]$ | [1 −1] |
| 2 | $\left[1\ e^{\frac{j4\pi}{3}}\ e^{\frac{j2\pi}{3}}\right]$ | N/A |

Figure 8:
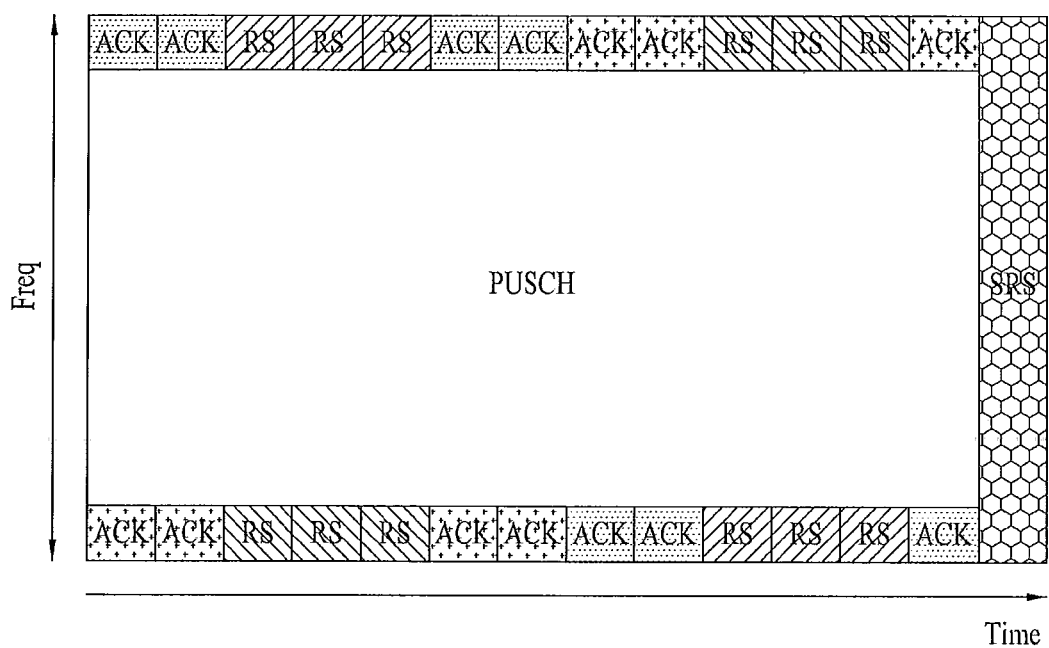
FIG. 8 is a diagram illustrating a resource mapping structure when a shortened ACK/NACK format is applied.

FIG. 8 illustrates a resource mapping structure when a shortened ACK/NACK format is applied. The shortened ACK/NACK format is used when it is necessary to concurrently transmit ACK/NACK and an SRS The shortened ACK/NACK format may be configured by higher layer signaling.

Next, PUCCH format 1 is described. PUCCH format 1 is a control channel used for SR transmission.

SR is transmitted in a scheme in which a UE requests or does not request to be scheduled. An SR channel reuses an ACK/NACK channel structure in PUCCH format 1a/1b and is configured by an On-Off Keying (OOK) scheme based on ACK/NACK channel design. In the SR channel, no RSs are transmitted. Accordingly, a length-7 sequence is used in a normal CP and a length-6 sequence is used in an extended CP. Different cyclic shifts and orthogonal covers may be assigned to the SR and ACK/NACK.

FIG. 9 illustrates the structure of an SR channel in one slot. Referring to FIG. 9(a), a length-7 sequence is divided into two orthogonal sequences (sequence 1 and sequence 2) in a normal CP. Referring to FIG. 9(b), a length-6 sequence is divided into two orthogonal sequences (sequence 1 and sequence 2) in an extended CP.

Figure 10:
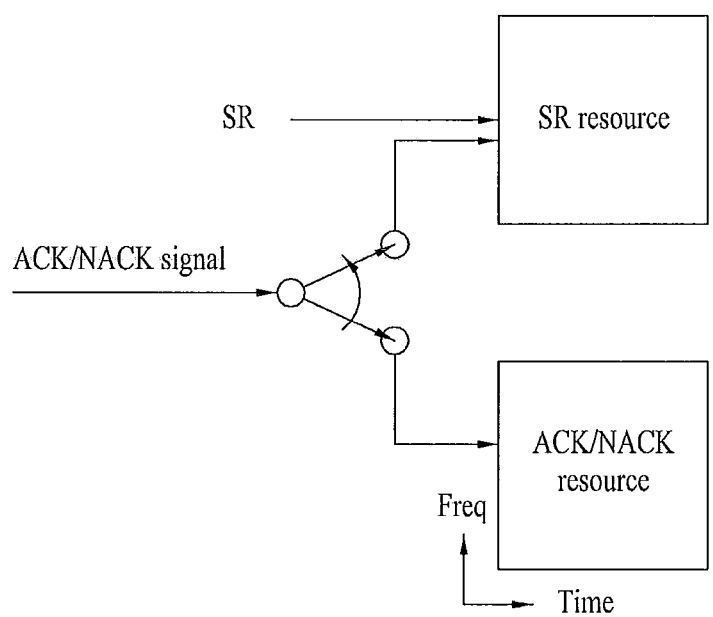
FIG. 10 is a diagram explaining concurrent transmission of ACK/NACK information and SR.

Concurrent transmission of ACK/NACK information and SR is described with reference to FIG. 10. As described previously, a UE may transmit HARQ ACK/NACK and SR in the same subframe. For positive SR transmission, the UE transmits HARQ ACK/NACK through a resource assigned for SR. For negative SR transmission, the UE transmits HARQ ACK/NACK through a resource assigned for ACK/NACK.

Next, PUCCH formats 2/2a/2b are described. PUCCH formats 2/2a/2b are control channels used for channel measurement feedback (CQI, PMI, and RI) transmission.

In PUCCH formats 2/2a/2b, modulation by a CAZAC sequence is supported and a QPSK modulated symbol is multiplied by a length-12 CAZAC sequence. A cyclic shift of a sequence varies between symbols and slots. Orthogonal covering is used for an RS.

Figure 11:
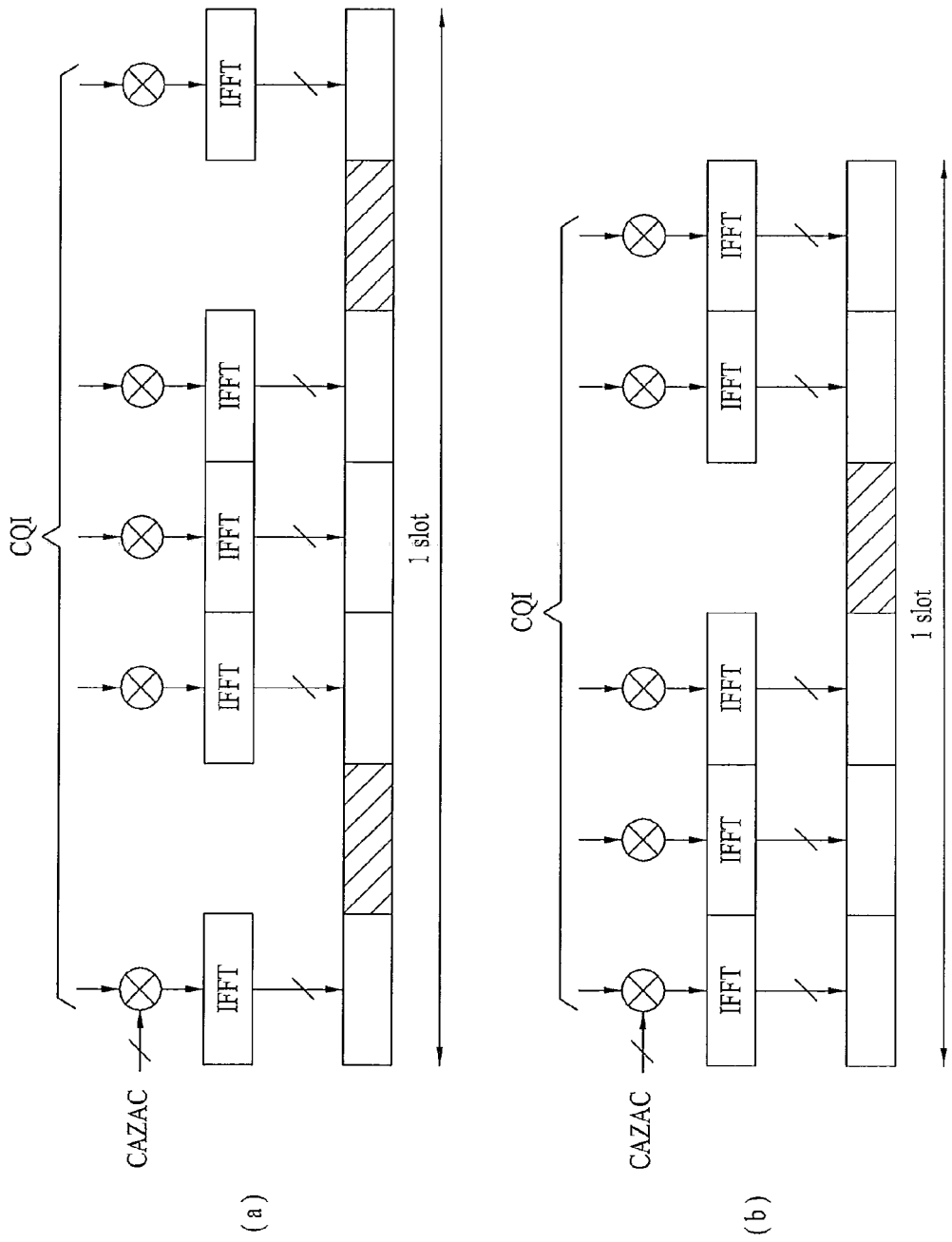
FIG. 11 is a diagram illustrating a channel structure of CQI information bits.

FIG. 11 is a diagram illustrating a channel structure of CQI information bits. The CQI information bits may include one or more fields. For example, a CQI field indicating a CQI index for determining an MCS, a PMI field indicating an index of a precoding matrix in a codebook, and an RI field indicating a rank may be included in the CQI information bit.

Referring to FIG. 11(a), RSs are carried in two SC-FDMA symbols which are separated by an interval of three SC-FDMA symbols among 7 SC-FDMA symbols included in one slot and CQI information is carried in the other five SC-FDMA symbols. The reason why two RSs are used in one slot is to support a high-speed UE. Respective UEs are distinguished using sequences. CQI information symbols are transmitted by being modulated throughout all SC-FDMA symbols. An SC-FDMA symbol is comprised of one sequence. Namely, the UE modulates CQI using each sequence and transmits the modulated CQI.

The number of symbols which can be transmitted during one TTI is 10 and modulation of CQI information is determined up to QPSK. Since a CQI value of two bits can be carried in an SC-FDMA symbol when QPSK mapping is used, a CQI value of 10 bits can be carried in one slot. Accordingly, a CQI value of a maximum of 20 bits can be carried in one subframe. To spread CQI information in the frequency domain, a frequency domain spread code is used.

A CAZAC sequence (e.g. ZC sequence) may be used as the frequency domain spread code. Alternatively, other sequences having a good correlation characteristic may be applied as the frequency domain spread code. Especially, control channels can be distinguished by applying CAZAC sequences having different cyclic shift values. IFFT is performed upon CQI information spread in the frequency domain.

FIG. 11(b) illustrates an example of transmission of PUCCH format 2/2a/2b in an extended CP. One slot includes 6 SC-FDMA symbols. An RS is carried in one OFDM symbol among 6 OFDM symbols of each slot and CQI information bits are carried in the other five OFDM symbols. Except this, the example of the case of the normal CP of FIG. 11(a) is identically applied.

Orthogonal covering used for RSs of FIGS. 11(a) and 11(b) is shown in Table 5.

TABLE 5

| Normal CP | Extended CP |
|---|---|
| [1 1] | [1] |

Figure 12:
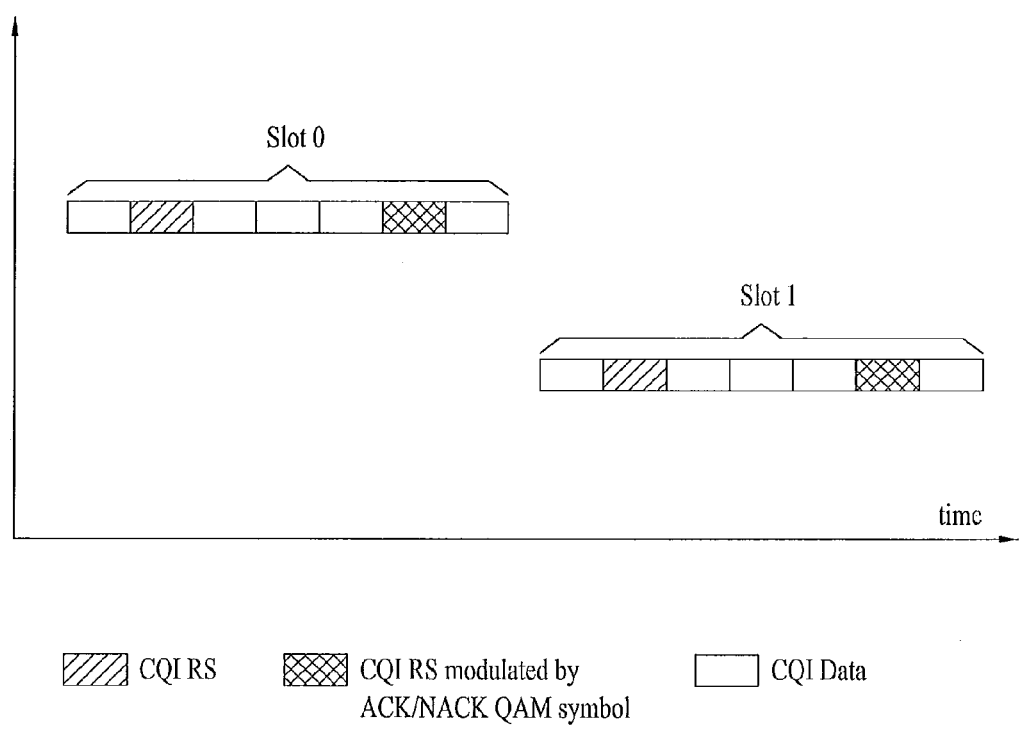
FIG. 12 is a diagram explaining concurrent transmission of CQI information and ACK/NACK information.

Concurrent transmission of CQI information and ACK/NACK information is described with reference to FIG. 12.

In a normal CP, CQI information and ACK/NACK information can be concurrently transmitted using PUCCH format 2a/2b. ACK/NACK information may be transmitted through a symbol in which a CQI RS of FIG. 12 is transmitted. That is, in a normal CP, the second RS is modulated by an ACK/NACK symbol. If the ACK/NACK symbol is modulated through a BPSK scheme as in PUCCH format 1a, a CQI RS is modulated by an ACK/NACK symbol through the BPSK scheme and, if the ACK/NACK symbol is modulated through a QPSK scheme as in PUCCH format 1b, the CQI RS is modulated by the ACK/NACK symbol through the QPSK scheme. Meanwhile, in an extended CP, the CQI information and the ACK/NACK information are concurrently transmitted using PUCCH format 2 and, to this end, the CQI information and the ACK/NACK information are joint-coded.

For description of the PUCCH except for the above description, reference may be made to a standard document (e.g. 3GPP TS36.211 section 5.4) and details thereof are omitted for clarity of description. However, the contents disclosed in the above standard document for the PUCCH are applicable to a PUCCH used in various embodiments of the present invention which will be described later.

In the case where the above-described CA is applied, generally, DL/UL CC linkage may be configured for UE-specific (or RN-specific) carrier assignment, as a means for configuring a carrier used for transmission of DL and UL data transport physical channels (PDSCH and PUSCH) and DL and UL control information transport physical channels (PDCCH and PUCCH).

However, in various CA circumstances, it may be necessary to configure a UL CC for transmitting UL control information through a PUCCH or PUSCH as opposed to configuration of DL/UL CC linkage. Various embodiments of the present invention relate to UL CC configuration methods for transmitting UL control information through a DL/UL CC linkage configuration and a PUCCH or a PUSCH with respect to UL transmission entities in an area of an eNB (cell) or RN. Moreover, various embodiments of the present invention relate to methods for transmitting heterogeneous UL control information after performing multiplexing through one PUCCH channel in association with UL CC configuration methods for transmitting UL control information.

FIG. 13 is a diagram conceptually illustrating CCs for DL and UL. DL CCs and UL CCs of FIG. 13 may be assigned in an eNB (cell) or an RN. For example, the number of DL CCs may be set to N and the number of UL CCs may be set to M.

After performing an RRC connection configuration process (cell search, system information acquisition/reception, and initial random access processes) based on a certain single CC with respect to each of DL and UL through an initial access or initial deployment process, a UE may receive carrier configuration that is specific to each UE from an eNB through dedicated signaling (UE-specific RRC signaling or UE-specific L1/L2 PDCCH signaling). If carrier configuration for a UE is commonly performed in an eNB (cell or cell cluster) unit, carrier configuration may be provided through cell-specific RRC signaling or cell-specific UE-common L1/L2 PDCCH signaling. Also, carrier configuration information configured in the eNB may be signaled to the UE through system information for RRC connection configuration or may be signaled to the UE through additional system information or cell-specific RRC signaling after the RRC connection configuration process.

Hereinafter, although DL/UL CC configuration will be described centering on a relationship between an eNB and a UE, the present invention is not limited thereto. For example, the same principle may be applied even when an RN provides a UE within an RN zone with DL/UL CC configuration of the corresponding UE. Also, the same principle may be applied even when an eNB provides an RN within an eNB zone with DL/UL CC configuration of the corresponding RN. Although DL/UL CC configuration between the eNB and UE will be described hereinbelow for clarity, it should be noted that the same principle may be applied between the RN and the UE (access UL and DL) or between the eNB and RN (backhaul UL and DL).

DL/UL CC linkage may be implicitly configured in a process of uniquely assigning DL/UL CCs to individual UEs or may be explicitly configured through definition of an arbitrary signaling parameter.

Figure 14:
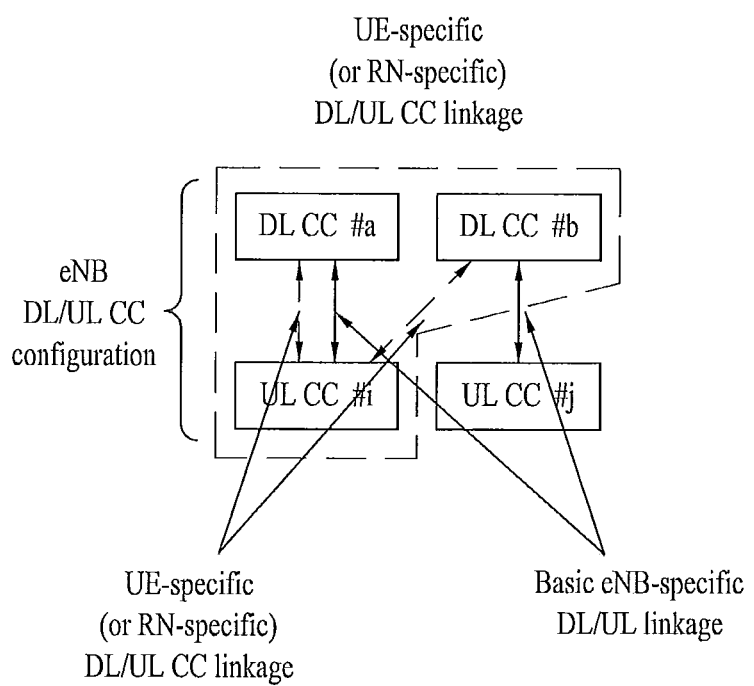
FIG. 14 is a diagram illustrating an example of DL/UL CC linkage.

FIG. 14 is a diagram illustrating exemplary DL/UL CC linkage. DL/UL CC linkage is defined according to assignment of two DL CCs (DL CC #a and DL CC #b) and one UL CC (UL CC #i) with respect to an arbitrary UE when an eNB configures CCs using two DL CCs (DL CC #a and DL CC #b) and two UL CCs (UL CC #i and UL CC #j). In DL/UL CC linkage configuration of FIG. 14, solid lines denote linkage configuration of DL CCs and UL CCs configured basically by the eNB and this linkage configuration may be defined in SIB-2. In DL/UL CC linkage configuration of FIG. 14, dotted lines denote linkage configuration of DL CCs and UL CCs configured with respect to a specific UE.

The following description is given of an example of DL/UL CCs configured as shown in FIG. 14 but the present invention is not limited thereto. Namely, in various embodiments of the present invention, the numbers of DL CCs and UL CCs configured by the eNB may be set to arbitrary values, the numbers of DL CCs and UL CCs which are UE-specifically configured or assigned within the configured DL CCs and UL CCs may be set to arbitrary values, and DL/UL CC linkage associated therewith may be defined by a scheme different from that of FIG. 14.

Hereinafter, detailed embodiments of a method for configuring UL CCs for UL control information transmission through a PUCCH or PUSCH of an arbitrary UE will be described in a situation where an eNB configures DL CCs and UL CCs, UE-specifically assigns DL/UL CCs, and configures DL/UL CC linkage associated therewith.

Control information transmitted by a UE to UL may include ACK/NACK for DL PDSCH and/or PDCCH transmission, Channel Status Information (CSI) measured for DL PDSCH and/or PDCCH transmission, and a Scheduling Request (SR) for requesting UL transmission resource assignment. The CSI may include CQI/PMI/RI or a direct channel quantization vector, a channel eigenvector, and a channel covariance matrix and, in the following description, they will be collectively referred to as CSI.

To transmit such UL control information, a PUCCH dedicated format may be used. A channel resource of the PUCCH format may be implicitly configured using an L1/L2 UL grant PDCCH, a DL channel assignment PDCCH, or a DL RB assignment index or may be explicitly configured through RRC configured UE-specific RRC control signaling. In addition, to transmit the UL control information, the UL control information may be mapped to a PUSCH physical resource according to a control information multiplexing scheme specified on a PUSCH.

Various embodiments of UL CC configuration for UL control information transmission which will be described below may be used for transmission of some or all of the UL control information and may be applied to various physical channels on which the UL control information is transmitted and to combinations thereof.

UL CC Configuration for UL Control Information Transmission Through DL/UL Cc Linkage Hereinafter, a method for configuring a UL CC on which UL control information is to be transmitted through UE-specific DL/UL CC linkage configured together with UE-specific DL/UL CC assignment will be described. For convenience of description, this method is called method 1 of the present invention.

Basically, a UL CC on which a UL transmission entity (UE or RN) transmits UL control information through a PUCCH or PUSCH may be configured through DL/UL CC linkage defined from DL/UL CC assignment which is configured specifically to the corresponding UL transmission entity.

Embodiment 1-1

This Embodiment 1-1 relates to UL CC configuration for UL ACK/NACK control information transmission.

ACK/NACK for DL PDSCH and/or PDCCH transmission is transmitted and two cases may be considered when an ACK/NACK transmission resource is configured. One is dynamic ACK/NACK which implicitly configures an ACK/NACK resource and the other is assignment of a UL ACK/NACK transmission resource through higher layer (RRC) configured UE-specific RRC signaling. Configuration of the UL ACK/NACK transmission resource through UE-specific RRC signaling may be used for PDSCH transmission, without an additional DL channel assignment PDCCH, based on semi-persistent scheduling or may be used for assignment of a definitely fixed ACK/NACK transmission resource based on a specific purpose.

Embodiment 1-1 may be applied to the above-described PUCCH format 1a/1b and to evolved PUCCH format configuration of the PUCCH format 1a/1b. Embodiment 1-1 may also be applied to UL ACK/NACK transmission through a PUSCH.

When configuring a UL CC to be used for the above three cases of ACK/NACK transmission resource configuration, the UL CC may be basically determined according to configuration of DL/UL CC linkage. More specifically, in higher layer configured PUCCH ACK/NACK transmission which is not based on a DL channel assignment PDCCH, ACK/NACK may be transmitted through a PUCCH or PUSCH on a UL CC linked with a DL CC on which a DL PDSCH is transmitted. Alternatively, a UL CC to be used for ACK/NACK transmission may be directly configured through explicit RRC signaling which is specific to a UL transmission entity during higher layer configuration. In this case, if cross-carrier scheduling is applied, a carrier indicator for other purposes may be used as an indicator for configuring a UL CC. The carrier indicator for other purposes may include, for example, a CC index or a Carrier Indication Field (CIF), which indicates a target carrier during CA.

Meanwhile, in the case of PDSCH transmission based on a DL channel assignment PDCCH, a method for configuring a UL CC on which ACK/NACK is to be transmitted through a PUCCH or PUSCH is as follows (dynamic ACK/NACK resource configuration is applied during ACK/NACK transmission through the PUCCH). If a DL channel assignment PDCCH and a PDSCH which is a target of the PDCCH are transmitted to a UL transmission entity through the same DL CC, it may be determined that a UL CC linked with the corresponding DL CC should be used for UL ACK/NACK transmission. Alternatively, a UL CC to be used for ACK/NACK transmission may be directly configured through explicit RRC signaling which is specific to a UL transmission entity or through a UL grant PDCCH. In this case, if cross-carrier scheduling is applied, a carrier indicator for other purposes may be used as an indicator for configuring UL CCs. The carrier indicator for other purposes may include, for example, a CC index or a CIF, which indicates a target carrier during CA.

Meanwhile, if the DL channel assignment PDCCH and the PDSCH which is a target of the PDCCH are transmitted to a UL transmission entity on different DL CCs (i.e. if cross-carrier scheduling is applied), a detailed method for configuring a UL CC on which the corresponding UL transmission entity transmits ACK/NACK through the PUCCH or PUSCH needs to be defined. To this end, the following two methods may be considered.

According to one method, the corresponding UL transmission entity may transmit UL ACK/NACK through the PUCCH or PUSCH on a UL CC linked with a DL CC on which the DL channel assignment PDCCH is transmitted. In other words, generally, when considering the fact that, if DL CC and UL CC linkage is configured, DL CCs on which a DL channel assignment PDCCH of a corresponding DL CC and a UL grant PDCCH of a corresponding UL CC are transmitted are the same, in a situation where UL ACK/NACK is transmitted through a PUSCH, it may be expressed that the UL transmission entity transmits the UL ACK/NACK through the PUSCH on the UL CC linked with the DL CC on which a UL grant PDCCH for the corresponding PUSCH is transmitted.

According to another scheme, the corresponding UL transmission entity may transmit the UL ACK/NACK through the PUCCH or PUSCH on a UL CC linked with a DL CC on which the PDSCH is transmitted.

In applying dynamic ACK/NACK, the following may be taken into consideration. When a UL CC linked with a DL CC on which a PDCCH is transmitted is used, an ACK/NACK resource on the UL CC may be configured using the lowest CCE index of the PDCCH as in a legacy 3GPP LTE system (e.g. release-8). When a UL CC linked with a DL CC on which a PDSCH is transmitted is used, an ACK/NACK resource on the UL CC may be configured using the lowest CCE index of the PDCCH as in the legacy 3GPP LTE system (e.g. release-8) or using the lowest PRB index of the PDSCH.

Embodiment 1-2

Embodiment 1-2 relates to UL CC configuration for UL CSI transmission.

To transmit CSI to UL, PUCCH format 2/2a/2b may be basically used. Alternatively, the CSI may be transmitted through an evolved PUCCH format of PUCCH format 2/2a/2b. Then, a PUCCH resource may be UL transmission entity-specifically configured through higher layer (RRC) configured RRC signaling. Meanwhile, for CSI feedback through a PUSCH, a resource for CSI transmission may be assigned through a UL grant PDCCH. Especially, if cross-carrier scheduling is applied, a carrier indicator for other purposes may be used as an indicator for configuring a UL CC. The carrier indicator for other purposes may include, for example, a CC index or a Carrier Indication Field (CIF), which indicates a target carrier during CA.

CSI feedback through a PUSCH includes the case where CSI is transmitted through a PUSCH when a PUSCH scheduled in an arbitrary UL transmission subframe and CSI to be periodically fed back through a PUCCH are present (i.e. an Uplink Control Information (UCI) piggyback scheme on a PUSCH) or the case where an indication that CSI should be periodically fed back through a PUSCH is transmitted to the UE through a UL grant PDCCH.

A UL CC used for CSI transmission of a UL transmission entity may basically be configured as a UL CC linked with a DL CC which is a CSI measurement target. In the case of CSI feedback through the PUSCH, a UL grant PDCCH of a specific DCI format for PUSCH resource configuration and transmission mode definition is transmitted and the CSI may be configured to be transmitted using a UL CC linked with a DL CC on which such a UL grant PDCCH is transmitted. As an example, this means that, when one DL CC is configured with respect to a certain UL transmission entity, i.e. a UE or RN, a UL grant PDCCH for a PUSCH of CSI for the corresponding DL CC is also transmitted on the same DL CC, and CSI of the corresponding DL CC is transmitted through a PUSCH on a UL CC linked with such a DL CC. As another example, this means that, when a plurality of DL CCs is configured with respect to a certain UL transmission entity, i.e. a UE or RN, a UL grant PDCCH for transmitting CSI for an individual DL CC through the PUSCH is transmitted, and the PUSCH for the CSI of the designated DL CC may be transmitted through a UL CC linked with the DL CC on which the corresponding UL grant PDCCH is transmitted. In this case, indication as to for which DL CC the corresponding UL grant PDCCH indicates aperiodic CSI feedback may be indicated through a CIF in DCI of the UL grant PDCCH or may be designated through RRC signaling for the corresponding UL transmission entity. Such a scheme may be usefully applied in an environment in which a cell-specific or UE-specific primary carrier is defined and a UE-specific PDCCH is transmitted through the corresponding primary carrier. Meanwhile, if a UL primary carrier or UL primary CC is additionally configured, ACK/NACK information may be transmitted using the corresponding UL primary carrier. For definition of the UL primary carrier, reference is made to Embodiment 1-4 which will be described later.

Embodiment 1-3

Embodiment 1-3 relates to UL CC configuration for UL SR transmission.

UL SR may be basically transmitted through PUCCH format 1 and a transmission channel resource thereof may be configured through higher layer (RRC) configured UE-specific RRC signaling on an arbitrary UL CC. If cross-carrier scheduling is applied, a carrier indicator for other purposes may be used as an indicator for configuring the UL CC. The carrier indicator for other purposes may be, for example, a CC index or a CIF, which indicates a target carrier during CA.

In configuring a UL CC for SR PUCCH transmission, a method for transmitting an SR PUCCH through a UL CC based on PUSCH transmission may be applied. If a cell-specific or UE-specific primary carrier is defined, the SR PUCCH may be transmitted through a UL CC linked with the corresponding primary carrier. Alternatively, if a UL primary carrier is separately configured, the SR PUCCH may be transmitted using the corresponding UL primary carrier.

Embodiment 1-4

Embodiment 1-4 relates to UL CC configuration when a UL CC for transmitting UL control information (UL ACK/NACK, CSI, and SR) is configured according to the above embodiments 1-1 to 1-3 so that two or more types of UL control information or all UL control information are transmitted using the same UL CC. Such a common UL CC on which UL control information is transmitted may be expressed as a UL primary CC or a UL anchor CC.

In other words, the UL primary carrier may be defined as one UL CC per UL transmission entity (UE or RN), on which the UL control information (ACK/NACK, CSI, and SR) is transmitted. More specifically, the UL primary carrier may be defined as one UL CC on which a PUCCH is transmitted. The UL primary carrier may be configured as one UL CC per UL transmission entity in all cases, for example, the case where a DL CC and a UL CC are symmetric or asymmetric and the case where cross scheduling is supported or is not supported.

Such definition of the UL primary carrier may be applied throughout the present document as well as to the present embodiment.

UL CC Configuration for UL Control Information Using Explicit Signaling

Hereinafter, a method for configuring a UL CC on which a UL transmission entity (e.g. UE) transmits UL control information using explicit signaling from a UL reception entity (e.g. eNB) will be described. For convenience of description, this method is called method 2 of the present invention.

In method 2, when a UL transmission entity configures a UL CC for transmitting UL control information (more than one type of UL control information) through a PUCCH or PUSCH, a UL CC on which the UL control information is transmitted through cell-specific or UE-specific RRC signaling or L1/L2 control signaling (e.g. a PDCCH of a specific DCI format) may be explicitly signaled. The range of an explicitly signaled UL CC may include UL CCs configured by an eNB or UL CCs which are specific to the UL transmission entity. Especially, if cross-carrier scheduling is applied, a carrier indicator for other purposes may be used as an indicator for configuring a UL CC. The carrier indicator for other purposes may include, for example, a CC index or a CIF, which indicates a target carrier during CA.

Embodiment 2-1

Embodiment 2-1 relates to UL CC configuration for UL ACK/NACK transmission.

ACK/NACK for DL PDSCH and/or PDCCH transmission is transmitted and two cases may be considered when an ACK/NACK transmission resource is configured. One is dynamic ACK/NACK which implicitly configures an ACK/NACK resource and the other is assignment of a UL ACK/NACK transmission resource through higher layer (RRC) configured UE-specific RRC signaling. Assignment of the UL ACK/NACK transmission resource through higher layer (RRC) configured UE-specific RRC signaling may be used for PDSCH transmission, without an additional DL channel assignment PDCCH, based on semi-persistent scheduling or may be used for assignment of a definitely fixed ACK/NACK transmission resource based on a specific purpose.

Embodiment 2-1 may be applied to the above-described PUCCH format 1a/1b and to evolved (or newly introduced) PUCCH format configuration of the PUCCH format 1a/1b. Embodiment 2-1 may also be applied even to UL ACK/NACK transmission through a PUSCH.

When configuring a UL CC to be used for the above three cases of ACK/NACK transmission resource configuration, basically, the UL CC used for ACK/NACK transmission may be explicitly signaled through cell-specific or UE-specific RRC signaling or L1/l2 control signaling (e.g. a UL grant of a specific DCI format or a UL grant or arbitrary purpose dedicated PDCCH). More specifically, ACK/NACK may be signaled to be transmitted through a PUCCH or PUSCH on one or more UL CCs among UL CCs configured by en eNB. In this case, if cross-carrier scheduling is applied, a carrier indicator for other purposes may be used as an indicator for configuring a UL CC. The carrier indicator for other purposes may include, for example, a CC index or a CIF, which indicates a target carrier during CA.

When a UL CC configured using such explicit signaling is used, an ACK/NACK resource on the UL CC may be configured using the lowest CCE index of a PDCCH as in a legacy 3GPP LTE system (e.g. release-8). If DL transmission is performed through a plurality of PDSCHs, the ACK/NACK resource configuration using only the lowest CCE index of the PDCCH may generate collision in ACK/NACK resource configuration corresponding to the plurality of PDSCHs. Then other criteria may be used for ACK/NACK resource configuration. For example, the lowest PRB index of the PDSCH may be used for ACK/NACK resource configuration.

In a situation in which a cell-specific or UE-specific UL primary carrier is configured, explicit signaling for configuring a UL CC for ACK/NACK transmission may be replaced with additional explicit signaling for configuring a UL primary carrier. If the UL primary carrier is implicitly configured (e.g. on a UE CC, linkage of which is basically configured with a DL CC in an eNB) through DL primary carrier configuration, explicit signaling for configuring a UL CC for ACK/NACK transmission may be replaced with additional explicit signaling for configuring a DL primary carrier and a UL primary carrier may be indirectly configured.

Embodiment 2-2

Embodiment 2-2 relates to UL CC configuration for UL CSI transmission.

To transmit CSI to UL, PUCCH format 2/2a/2b may be basically used. Alternatively, the CSI may be transmitted through an evolved PUCCH format from PUCCH format 2/2a/2b. Then, a PUCCH resource may be UL transmission entity-specifically configured through higher layer (RRC) configured RRC signaling. Meanwhile, for CSI feedback through a PUSCH, a resource for CSI transmission may be assigned through a UL grant PDCCH.

When configuring a UL CC used for CSI transmission of a UL transmission entity, basically, the UL CC used for CSI transmission may be explicitly signaled through cell-specific or UE-specific RRC signaling or L1/l2 control signaling (e.g. a UL grant of a specific DCI format or a UL grant or arbitrary purpose dedicated PDCCH). If a UL primary carrier is separately configured, explicit signaling for configuring a UL CC for CSI transmission may be replaced with explicit signaling for UL primary carrier configuration. Especially, if cross-carrier scheduling is applied, a carrier indicator for other purposes may be used as an indicator for configuring a UL CC. The carrier indicator for other purposes may include, for example, a CC index or a CIF, which indicates a target carrier during CA.

Embodiment 2-3

Embodiment 2-3 relates to UL CC configuration for UL SR transmission.

UL SR may be basically transmitted through PUCCH format 1 and a transmission channel resource thereof may be configured through higher layer (RRC) configured UE-specific RRC signaling on an arbitrary UL CC.

In configuring a UL CC for SR PUCCH transmission, basically, the UL CC for SR transmission may be explicitly signaled through cell-specific or UE-specific RRC signaling or L1/L2 control signaling (e.g. a PDCCH of a specific DCI format).

If a cell-specific or UE-specific primary carrier is defined, an SR PUCCH may be transmitted through a UL CC linked with the corresponding primary carrier. Alternatively, if a UL primary carrier is separately configured, the SR PUCCH may be transmitted using the corresponding UL primary carrier. In this case, explicit signaling for configuring a UL CC for SR transmission may be replaced with explicit/implicit signaling for designating a DL primary carrier or UL primary carrier.

Embodiment 2-4

Embodiment 2-4 relates to UL CC configuration when a UL CC for transmitting UL control information (UL ACK/NACK, CSI, and SR) is configured according to the above Embodiments 2-1 to 2-3 through explicit signaling (cell-specific or UE-specific RRC signaling or L1/L2 control signaling (e.g. a PDCCH of a specific DCI format)) so that two or more types of UL control information are transmitted using the same UL CC through an eNB or RN which is an entity of explicit signaling. Such a common UL CC may be expressed as a UL primary carrier (or UL Primary CC) or a UL anchor carrier (or UL anchor Primary CC).

While the various embodiments proposed in the above-described method 1 and method 2 have been individually described according to the type of control information transmitted by a UL transmission entity, they may be identically applied even to a method for configuring a UL CC on which all the UL control information is transmitted.

Multiplexing of UL Control Information

Hereinafter, a method for transmitting UL control information by performing multiplexing is described. For convenience of description, this method is called method 3 of the present invention.

In a communication system to which CA technology is applied, a UE may transmit various types of UL control information after performing multiplexing through a PUCCH format or a PUSCH in a configured UL CC (e.g. a UL CC or UL primary carrier configured according to the above method 1 or 2).

For example, if one or more DL CCs in DL are transmitted through CA, a plurality of DL transport blocks may be transmitted (this may be called transmission of multiple PDSCHs based on transmission of a single codeword) and a plurality of pieces of UL ACK/NACK information corresponding to the plurality of transport blocks needs to be transmitted. Namely, one piece of ACK/NACK information per DL transport block may be transmitted. In addition, if a DL scheduler requires channel measurement information for a plurality of DL CCs within a DL active CC set (a set of RRC configured CCs), a plurality of pieces of CSI information needs to be transmitted.

When such a plurality of pieces of UL control information (e.g. a plurality of pieces of ACK/NACK information and a plurality of pieces of CSI) is transmitted through the PUCCH or PUSCH in a configured UL CC, a detailed method for multiplexing and then transmitting the plurality of pieces of UL control information is needed.

Since UL control information can be broadly divided into three types (ACK/NACK, CSI, and SR), multiplexing transmission of different types of UL control information may be summarized as the following three cases.

Case 1: multiplexing transmission of UL ACK/NACK information and CSI

Case 2: multiplexing transmission of UL ACK/NACK information and SR information

Case 3: multiplexing transmission of UL CSI and SR information

When such UL control information is transmitted after performing multiplexing through the PUCCH or PUSCH in a configured UL CC (e.g. UL CC configured according to the above method 1 or method 2), detailed multiplexing schemes will be described below.

In relation to a multiplexing scheme of different types of UL control information, PUCCH format 1/1a/1b and PUCCH format 2/2a/2b defined in a legacy 3GPP LTE system (e.g. refer to release-8 or standard document 3GPP TS36.211 release-8) may be summarized as shown in the following Table 6.

TABLE 6

| PUCCH Format Type | Application |
| --- | --- |
| PUCCH format 1 | Scheduling request transmission |
| PUCCH format 1a | 1 bit ACK/NACK transmission |
| PUCCH format 1b | 2 bit ACK/NACK transmission |
| PUCCH format 2 | CQI/PMI/RI (or CSI in LTE-advanced) transmission |
| PUCCH format 2a | CQI/PMI/RI (or CSI in LTE-advanced) + 1 bit ACK/NACK transmission in normal CP case |
| PUCCH format 2b | CQI/PMI/RI (or CSI in LTE-advanced) + 2 bit ACK/NACK transmission in normal CP case |

In a normal CP, multiplexing transmission of CSI and 1-bit or 2-bit ACK/NACK may use PUCCH format 2a/2b as shown in Table 6. In addition, multiplexing transmission of SR and ACK/NACK may apply a transmission method using PUCCH format 1a or 1b as an SR PUCCH resource reserved for SR transmission through RRC signaling (refer to FIG. 10). In an extended CP, multiplexing transmission of CSI and 1-bit or 2-bit ACK/NACK may apply a method in which ACK/NACK information and CSI are joint coded and transmitted using the PUCCH format 2 as described in a legacy 3GPP LTE standard document (e.g. release-8 version of 3GPP LTE TS36.212 and TS36.213). Multiplexing transmission of SR information and CSI may apply a method for transmitting only the SR by dropping the CSI without transmission.

In an LTE-advanced system, an additional PUCCH format may be newly defined according to transmission of specific control information. The definition of the new PUCCH format may be caused by variation of modulation and multiplexing according to increase of the amount of UL transmission control information or may be caused by different mapping schemes or transmission schemes from an existing format transmission scheme in physical transmission resource mapping after physical channel formation. For example, the new PUCCH format may be defined due to a channel selection scheme for reserving a plurality of PUCCH transmission resources and expressing information through resource selection, new PUCCH format design including a modulation scheme or precoding for extension of a payload size, a scheme for differently multiplexing control information in terms of a symbol unit or a configuration code sequence on a PUCCH, a scheme for multiplexing different control information per slot in the PUCCH format 1a/1b, a method for transmitting ACK/NACK control information using a PUCCH format 2 series, or multicode modulation.

When a UL subframe is present in which different types of UL control information is multiplexed and transmitted on a configured UL CC (e.g. a UL CC or UL primary carrier configured according to the above method 1 or 2) with respect to the above PUCCH types, a plurality of PUCCH resources may be configured for all or some of the types of UL control information (multi PUCCH configuration). For example, if a plurality of PDSCHs is transmitted through a plurality of DL CCs (transmission of multiple DL transport blocks) and a plurality of UL ACKs/NACKs corresponding thereto is transmitted through a UL CC, PUCCHs of the same or less number (e.g. half) as or than the number of PDSCHs may be configured. As another example, for feedback of CSI as L2 measurement for scheduling for a plurality of DL CCs, PUCCHs for measurement of the same or less number as or than the number of DL CCs may be configured. Embodiments for transmitting different types of UL control information in the same UL subframe are proposed in a situation where specific control information is configured through a plurality of PUCCHs. Embodiments A to E which are detailed embodiments of the present method 3 will be described below.

Embodiment A

The present embodiment relates to a method for configuring a PUCCH transmission channel for individual control information without multiplexing specific control information through one PUCCH.

It is assumed that N (N≥1) PUCCHs are configured so as to transmit a certain type A of UL control information among the above-described types (ACK/NACK, CSI, or SR) of UL control information in a specific UL subframe and M (M≥1) PUCCHs are configured so as to transmit another type B of UL control information in the same subframe. That is, multiple PUCCHs may be concurrently transmitted by PUCCH decoupling. The case where a plurality of PUCCHs is configured for transmission of different types of UL control information means basically that a single-carrier property for maintaining a low Peak-to-Average Power Ratio (PAPR) or Cubic Metric (CM) in UL transmission is not maintained any more. Accordingly, a method for transmitting control information through N+M (N+M≥2) PUCCHs may be applied without multiplexing (including dropping or joint coding) different types of control information on an arbitrary PUCCH channel.

In a situation in which N PUCCHs and M PUCCHs are required to transmit the UL control information A and B in the same UL subframe, the control information A and B may be transmitted through N' (N'<N) PUCCHs and M' (M'<M) PUCCHs, i.e. through a total of N'+M' PUCCHs by applying an information compression scheme (e.g. information bundling or PUCCH channel selection scheme) in the UL control information A and B or a PUCCH format providing a new extended payload size.

As a detailed example related to this, when P (P≥1) PUCCH formats 1a or PUCCH formats 1b for transmission of a plurality of pieces of ACK/NACK information are configured and Q (Q≥1) PUCCH formats 2 for CSI transmission are configured, the P PUCCH formats 1a/1b and Q PUCCH formats 2 may be configured to be transmitted in the same UL subframe without multiplexing ACK/NACK and CSI in PUCCH format 2. Additionally, ACK/NACK may be transmitted through P' (P'<P) PUCCH format 1a or PUCCH format 1b through ACK/NACK bundling or ACK/NACK channel selection (for multiple PUCCH transmission resources in a configured UL CC) and CSI may be transmitted through Q' (1≥Q'<Q) PUCCHs through a new PUCCH format having an extended payload size from the PUCCH format 2 (by a multiple code modulation or multiple antenna transmission scheme) or through predetermined TDM based information division multiplexing. Accordingly, ACK/NACK and CSI may be multiplexed and transmitted through P'+Q' PUCCHs.

Embodiment B

The present embodiment relates to a method for multiplexing a plurality of different types of UL control information through an arbitrary PUCCH and configuring a mapping (or pair) relationship between the different multiplexed types of UL control information based on a predefined rule (including implicit relationship configuration) or signaling. The different types of control information may be multiplexed by applying the same method as a method defined in a legacy 3GPP LTE system (e.g. refer to 3GPP LTE release-8 or standard document 3GPP TS36.211 release-8) with reference to the PUCCH part described in this document.

For Embodiment A, it may be demanded that the number of PUCCHs concurrently transmitted (multiplexed) in one UL subframe be restricted to a minimum of one. For this, a multiplexing method of different types of UL control information defined in a legacy 3GPP LTE system (e.g. refer to 3GPP LTE release-8 and standard document 3GPP TS36.211 release-8) may be totally or partially applied to the UL control information A and UL control information B. Here, since the size of UL control information which can be multiplexed in the multiplexing method of different types of UL control information defined in the legacy 3GPP LTE system is designed according to a single carrier situation, it may be difficult to perform multiplexing of a plurality of pieces of UL control information for a plurality of DL CCs considered in the present invention through one PUCCH. In consideration of this fact, detailed embodiments for multiplexing different types of control information in a system supporting CA will be described below.

Embodiment B-1

Embodiment B-1 relates to exemplary multiplexing transmission of ACK/NACK and CSI. UL transmission of ACK/NACK and CSI may be performed after multiplexing through a PUCCH format 2 series. In this case, a method for modulating 1-bit or 2-bit ACK/NACK information to BPSK (or binary Walsh covering) or QPSK (or DFT {1, −1, j, −j} based Walsh covering) on an RS symbol of PUCCH format 2 may be applied. If the multiplexed ACK/NACK information is bigger than 2 bits, a method for raising a modulation order on an RS symbol may be applied. For example, the ACK/NACK information may be modulated to 8 PSK or 16 PSK. On the contrary, the multiplexed ACK/NACK information may be transmitted using a conventional scheme through compression of a maximum of 2 bits by bundling the ACK/NACK information to a maximum of 2 bits in a CC domain, a spatial (or spatial codeword) domain, or a time (subframe level) domain. Details thereof will be described in Embodiment B-2. The multiplexed ACK/NACK and CSI may be defined as ACK/NACK and CSI for a DL transport block in the same DL CC.

For example, if ACK/NACK and CSI are transmitted in correspondence to transmission on DL CC#1 and DL CC#2, ACK/NACK 1 and CSI 1 corresponding to DL CC#1 transmission may be multiplexed through PUCCH format 2a/2b and ACK/NACK 2 and CSI 2 corresponding to DL CC#2 transmission may be multiplexed through PUCCH format 2a/2b.

Embodiment B-2

Embodiment B-2 relates to another exemplary multiplexing transmission of ACK/NACK and CSI. For UL transmission of ACK/NACK and CSI, ACK/NACK and CSI may be multiplexed through PUCCH format 2 series and then transmitted. In this case, the case in which ACKs/NACKs for DL transport blocks on a plurality of DL CCs are mixed through an information-level compression method (information-level compression may apply bundling or channel selection method). For ACKs/NACKs and CSI to be transmitted through multiplexing on an arbitrary UL CC configured with respect to a UE, logical indexes may be configured through a preset condition or rule (preset condition or rule may include implicit relationship configuration, or carrier index order or equation). A virtual pair is configured between ACK/NACK and CAI according to an order of the configured indexes and the method for multiplexing different types of UL control information defined in a legacy 3GPP LTE system (e.g. release-8) may be applied based on PUCCH format 2 between the paired ACK/NACK and CSI. As an example, a virtual pair may be sequentially configured and multiplexed in order of small carrier index.

For example, if ACK/NACK and CSI are transmitted in correspondence to transmission in DL CC#1 and DL CC#2, ACK/NACK information which bundles ACK/NACK 1 and ACK/NACK 2 corresponding to transmission of DL CC#1 and DL CC#2 may be multiplexed with CSI 1 through PUCCH format 2a/2b and then transmitted and CSI 2 for DL CC#2 may be transmitted through PUCCH format 2.

Embodiment B-3

Embodiment B-3 relates to multiplexing transmission of SR and ACK/NACK. Generally, one PUCCH resource is UE-specifically reserved for SR. In the case of ACK/NACK, however, the case in which a plurality of information should be transmitted according to DL transport blocks may occur (ACK/NACK information about two transport blocks in a spatial domain may be bound as 2-bit information). In this case, ACK/NACK information may be configured through PUCCH format 1a (1-bit ACK/NACK) or PUCCH format 1b (2-bit ACK/NACK) and the configured ACK/NACK may be transmitted through a PUCCH resource configured for SR through RRC signaling. That is, the method defined in the legacy 3GPP LTE system (e.g. release-8) may be applied (refer to FIG. 10) to multiplex SR and ACK/NACK information. That is, if SR is positive, in other words, if a UE demands SR, this means that a method for multiplexing SR and ACK/NACK may be applied. Here, ACK/NACK information multiplexed with SR may be preconfigured before performing multiplexing with SR through the following four processes.

First, ACK/NACK multiplexed with positive SR may be determined by order of a carrier index or order of a direct logical index for ACK/NACK. For example, ACK/NACK of the highest or lowest index among a plurality of pieces of ACK/NACK information may be multiplexed with SR (ACK/NACK is mapped to an SR resource) for transmission. The other ACK/NACK information may be transmitted according to RRC configuration.

Second, one bundled ACK/NACK derived by bundling a plurality of ACKs/NACKs may be multiplexed with a positive SR. For example, a plurality of ACKs/NACKs is compressed into a maximum of two bits by bundling the ACKs/NACKs into one bit or a maximum of two bits in a CC domain, spatial (or spatial codeword) domain, or time (subframe level) domain and PUCCH format 1a or PUCCH format 1b may be transmitted as a reserved SR resource by applying an existing multiplexing scheme.

Third, if a plurality of bundled ACKs/NACKs is derived by bundling a plurality of ACKs/NACKs by a group scheme (this may be expressed as partial bundling or group-wise bundling), ACK/NACK multiplexed with positive SR may be determined by order of a carrier index or order of a direct logical index for ACK/NACK. For example, bundled ACK/NACK of the highest or lowest index may be multiplexed with positive SR. The other bundled ACK/NACK information may be transmitted through a transmission resource according to RRC configuration.

Fourth, ACK/NACK for a DL transport block on a DL CC mapped with a corresponding UL CC according to a specific rule may be multiplexed with positive SR (ACK/NACK information about two transport blocks in a spatial domain may be bound as 2-bit information). Here, the specific rule may include a default transmission/reception (Tx/Rx) separation rule, cell-specific DL/UL CC linkage configuration, or UE-specific DL/UL CC linkage configuration. For example, ACK/NACK for transmission on a DL CC linked with a UL primary carrier is multiplexed with positive SR and the other ACK/NACK may be transmitted according to RRC configuration.

Embodiment C

Embodiment C relates to a new multiplexing method different from the method for multiplexing different types of UL control information defined in the legacy 3GPP LTE system (e.g. release-8).

When multiplexing a plurality of different types of UL control information through a PUCCH, a mapping (or pair) relationship between control information to be multiplexed may be configured based on a predefined rule (including implicit relationship configuration) or signaling.

The above-described Embodiment B is based on PUCCH formats and the multiplexing method of different types of UL control information defined in the legacy 3GPP LTE system (e.g. release-8). Meanwhile, Embodiment C relates to a multiplexing method of different types of UL control information considering introduction of a new PUCCH format in an LTE-advanced system.

If new PUCCH formats introduced in the LTE-advanced system follow a basic channel structure and CDM/FDM resource multiplexing method from the existing PUCCH formats 1/1a/1b or PUCCH formats 2/2a/2b, it is proposed that the detailed multiplexing methods of different types of UL control information proposed in the above described Embodiment B be applied.

Meanwhile, even if the new PUCCH formats introduced in the LTE-advanced system have a basic channel structure which is different from the existing PUCCH formats (1/1a/1b or 2/2a/2b), the detailed multiplexing methods of different types of UL control information proposed in the above Embodiment B may be applied using the same logical method by differentiating a target PUCCH format. Alternatively, a new type of multiplexing method may be defined. Even in this case, it is proposed that the method for selecting target UL control information among the plurality of pieces of UL control information proposed in the above Embodiment B and the multiplexing method using compression at an information level be applied to the new type of multiplexing method.

Embodiment D

Embodiment D relates to a method for selectively applying one or more multiplexing methods among the above Embodiment A, Embodiment B, and Embodiment C in consideration of a specific condition. The specific condition may include aspects of concurrently transmitted pieces of UL control information, a UL channel condition and/or UL transmission power of a UE.

In the above Embodiments A to D for multiplexing and transmitting different types of UL control information using a PUCCH, the case in which multiple specific types of UL control information are derived due to configuration of a plurality of DL CCs is additionally described. As described above, if corresponding UL control information is expressed or transmitted through one PUCCH, a method for multiplexing multiple types of control information or dropping one of the multiple types of control information may be applied based on the method defined in the legacy 3GPP LTE system (e.g. release-8). On the contrary, if a corresponding UE is not in a power-limited state, individual control information may be transmitted on a configured UL CC using individual PUCCHs, i.e. a plurality of PUCCHs.

Embodiment E

Embodiment E relates to multiplexing of different types of UL control information on a PUSCH. The different types of UL control information may be different types of control information such as ACK/NACK, CSI, and SR, or when a plurality of specific types of UL control information is derived in a situation where a plurality of DL CCs is configured, may be control information for different DL CCs of each of the specific types of UL control information. Multiplexing between different types of UL control information in the same UL subframe on a configured UL CC (e.g. UL CC or UL primary carrier configured in the above method 1 and method 2) may be performed on the PUSCH. Embodiment E relates to multiplexing transmission of UL control information through a PUSCH resource irrespective of presence/absence of data to be transmitted through the PUSCH.

A multiplexing method of data and control information on the PUSCH and a physical resource mapping method in a PRB, which are defined in the legacy 3GPP LTE system (e.g. release-8), may be identically applied to one method for multiplexing different types of UL control information on the PUSCH.

Meanwhile, as another method for multiplexing different types of UL control information on the PUSCH, the different types of UL control information may be multiplexed in a MAC message form and then transmitted. In this case, a transport block may be mapped to a physical resource in a time-first manner to achieve reliable feedback through HARQ. A mapping order of different types of UL control information to the physical resource may be determined, for example, in order of SR>ACK/NACK>CSI, CSI>ACK/NACK>SR, ACK/NACK>SR>CSI, or CSI>SR>ACK/NACK. Transmission of SR through the PUSCH may mean a request for an additional resource on a UL CC rather than a request for a resource on a UL CC on which the SR is transmitted. As another example, physical resources of individual ACK/NACK information during ACK/NACK transmission for DL PDSCH transmission on a plurality of different DL CCs may be sequentially mapped starting from ACK/NACK having a low carrier index of a DL CC or starting from ACK/NACK having a high DL CC carrier index. Such a method may be identically applied even to CSI transmission. ACK/NACK or CSI for different DL CCs is based on a premise that they are jointly encoded.

Meanwhile, as still another method for multiplexing different types of UL control information on the PUSCH, the different types of UL control information may be multiplexed in a physical layer to an encoded bit level or a modulated symbol level so as to be mapped to a physical resource in a time-first manner. In this case, although HARQ retransmission is not performed, effective code rates or modulation orders may be differently applied to each of different types of UL control information according to information reliability requirements or Quality of Service (QoS) which varies with each of different types of control information. To support this, separate encoding may be performed by differentiating not only different types of UL control information but also the same type of UL control information in a DL CC unit. An order of different types of UL control information may be determined, for example, in order of SR>ACK/NACK>CSI, CSI>ACK/NACK>SR, ACK/NACK>SR>CSI, or CSI>SR>ACK/NACK. As another example, physical resources of individual ACK/NACK information during ACK/NACK transmission for DL PDSCH transmission on a plurality of different DL CCs may be sequentially mapped starting from ACK/NACK having a low carrier index of a DL CC or starting from ACK/NACK having a high DL CC carrier index. Such a method may be identically applied even to CSI transmission. ACK/NACK or CSI for different DL CCs is based on the premise that they are multiplexed in separate encoded states.

In a situation in which UL control information is generated as a plurality of pieces of information according to configuration of multiple DL CCs with respect to a specific UE or RN in a certain eNB, the control information may be configured to be designated in one LTE-release-8 or to be transmitted through a PUCCH of a newly introduced type for LTE-A. Basically, a multiplexing or dropping selection method for a concurrent transmission situation of plural types of UL control information predefined in LTE release-8/9 may be applied. On the contrary, if an LTE-A UE is not in a power-limited state, UL control information may be transmitted using individual PUCCHs through a configured PUCCH resource of each of pieces of UL control information through RRC signaling on a UL CC configured by the method proposed in the present invention.

All methods proposed in the present invention may be applied not only to UL configuration between an eNB and a UE but also to a UL control information transmission method in UL between an eNB or an RN or UL between an RN and a UE.

Channel Selection and Piggyback Transmission of UL Control Information Transmission This method relates to a piggyback transmission method of UL control information on a PUSCH in a situation in which channel selection is applied for feedback transmission of UL ACK/NACK for DL data channel transmission. The DL data channel transmission may be performed through a plurality of DL CCs configured with respect to a certain UE. Channel selection includes channel selection on a single carrier and channel selection on multiple carriers. Piggyback transmission of UL control information on a PUSCH indicates multiplexing transmission of UL data and UL control information on the PUSCH when UL data to be transmitted on the PUSCH is present at a transmission time of the UL control information. For convenience of description, the present method is called method 4 of the present invention.

Figure 15:
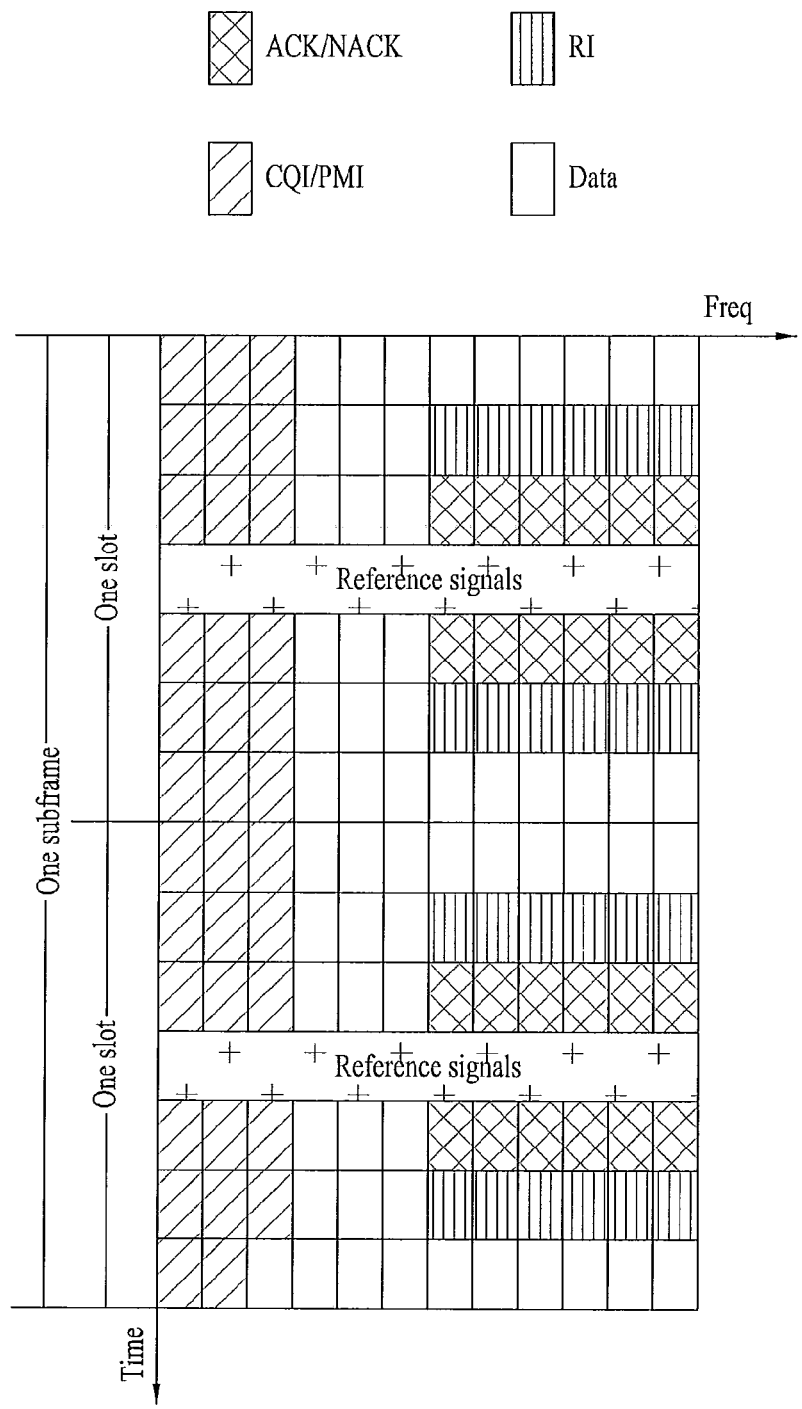
FIG. 15 is a diagram explaining a mapping scheme of UL data and UL control information on a UL data channel resource.

A piggyback transmission method of UL control information on the PUSCH is briefly described with reference to FIG. 15. FIG. 15 illustrates a mapping scheme of UL data and UL control information (ACK/NACK, CQI/PMI, and RI) on a PUSCH resource, defined in the legacy LTE system (3GPP LTE release-8 or 9). For example, as shown in FIG. 15, ACK/NACK information may be mapped to a PUSCH resource by puncturing some REs on data transmission symbols adjacent to a demodulation reference signal (DM-RS) transmission symbol (located at the fourth symbol of each slot). RI information may be mapped onto a PUSCH resource by applying rate matching for PUSCH transmission data symbols in some REs on transmission symbols adjacent to both sides in a slot boundary direction in an ACK/NACK transmission symbol.

Meanwhile, if PUCCH format 1a or 1b is used for UL ACK/NACK transmission, 1-bit or 2-bit ACK/NACK information may be transmitted. However, in a multicarrier system, it may be demanded that a larger size of ACK/NACK information than the size of ACK/NACK information acceptable in PUCCH format 1a/1b be expressed through single PUCCH transmission. In order to express ACK/NACK information of a larger size than 2 bits, a transmission resource for PUCCH format 1a/1b may be reserved and a transmission state size for ACK/NACK transmission may be increased by applying channel selection. As an example, 2 bits are expressed through the existing PUCCH format 1b and a part exceeding the two bits may be expressed through channel selection.

Channel selection is described in detail. ACK/NACK PUCCH transmission resources of a prescribed number configured in consideration of the transmission size of ACK/NACK information needed on a single UL CC or multiple UL CCs are reserved and ACK/NACK information of a part exceeding 2 bits may be expressed based on hypothesis as to which resource is selected from among the reserved ACK/NACK PUCCH transmission resources. For channel selection, reference is made to FIG. 16.

Figure 16:
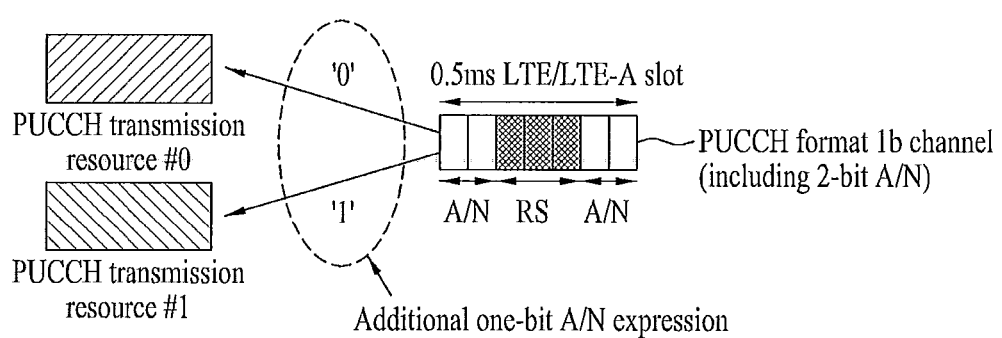
FIG. 16 is a diagram illustrating exemplary ACK/NACK channel selection.

FIG. 16 illustrates exemplary ACK/NACK channel selection. As illustrated in FIG. 16, two PUCCH format 1 resources (PUCCH transmission resources #0 and #1) for a 2-bit ACK/NACK PUCCH format 1b may be configured. If 3-bit ACK/NACK information is transmitted, two bits of the 3-bit ACK/NACK information may be expressed through the PUCCH format 1b and the other one bit may be expressed according to which resource is selected from the two PUCCH transmission resources. For example, hypothesis may be set such that, if PUCCH transmission resource #0 is selected, this means '0' and if PUCCH transmission resource #1 is selected, this means '1'. Since one bit (0 or 1) may be expressed by selecting one of the two PUCCH transmission resources, additional 1-bit ACK/NACK information may be expressed together with the 2-bit ACK/NACK information expressed through PUCCH format 1b.

Thus, if channel selection is applied to ACK/NACK information transmission, a UL transmission entity (UE) may transmit ACK/NACK information of the increased number of bits while using transmission energy for transmitting one PUCCH. Meanwhile, a UL reception entity (eNB) may attempt to detect all configured PUCCH transmission resources in order to detect a PUCCH to which ACK/NACK channel selection is applied.

As described with reference to FIG. 16, it is necessary to reserve ACK/NACK transmission PUCCH resources in order to apply an ACK/NACK channel selection scheme. Accordingly, the present invention proposes methods for reserving ACK/NACK transmission PUCCH resources. Hereinafter, methods for reserving ACK/NACK transmission PUCCH resources proposed in the present invention are described in detail when a single UL CC is configured and when a plurality of UL CCs is configured to a UE which is to transmit UL control information.

First, PUCCH transmission resources may be configured as follows when a single UL CC is configured for ACK/NACK transmission of a corresponding UE.

As an example, channel transmission resources for PUCCH format 1a/1b reserved for ACK/NACK channel selection may be configured in a PUCCH transmission PRB region of a corresponding UL CC and information about configuration may be provided to individual UEs through higher layer (e.g. RRC) signaling. This can be called an explicit ACK/NACK channel selection resource assignment scheme.

As another example, UL ACK/NACK transmission PUCCH resources may be configured based on the number of Control Channel Elements (CCEs) which are a PDCCH resource configuration unit on a specific DL CC. The specific DL CC may be a DL CC linked with the single UL CC or may be a DL CC configured and signaled in a higher layer (RRC) of an eNB. ACK/NACK transmission PUCCH resources corresponding in number to the PDCCH CCEs of the specific DL CC may be indexed according to CCE indexes and may be configured as a resource region for dynamic ACK/NACK resource assignment. For example, ACK/NACK transmission PUCCH transmission resources may be configured by the lowest CCE index of a DL channel assignment PDCCH. Thus, if a resource region for dynamic ACK/NACK resource assignment is configured, PUCCH transmission resources in which ACK/NACK is to be transmitted may be determined as follows. For example, if one or more DL channel assignment PDCCHs transmitted through the PDCCH transmission resource region for scheduling DL data transmission for any UE are present, ACK/NACK transmission PUCCH transmission resources may be designated by the lowest CCE index of the one or more DL channel assignment PDCCHs and all or some of the ACK/NACK transmission PUCCH transmission resources may be configured as all or some of channel selection resources of the UL CC. If other resources are demanded for channel selection, resources for channel selection may be configured through UE-specific higher layer (RRC) signaling. Such an ACK/NACK channel selection resource assignment scheme may be called a partially implicit channel selection resource assignment scheme and 'partially implicit' means providing partially explicit elements in ACK/NACK channel selection resource assignment. Meanwhile, if explicit information is not included for ACK/NACK transmission resource assignment when channel selection is applied, this may be called a fully implicit ACK/NACK channel selection resource assignment scheme.

In PUCCH transmission resource configuration of ACK/NACK channel selection, if DL grant PDCCH transmission is performed through PDCCH transmission resources on one DL CC (i.e. DL primary CC) configured through SIB-2 linkage with one UL CC on which the PUCCH is transmitted, PUCCH transmission resources for ACK/NACK transmission may be implicitly designated by the lowest CCE index for corresponding PDCCH transmission. If ACK/NACK PUCCH transmission resources larger in number than ACK/NACK PUCCH transmission resources designated by the lowest index for PDCCH transmission should be configured for ACK/NACK channel selection, resources for ACK/NACK channel selection may be explicitly configured through UE-specific higher layer (RRC) signaling. For explicit configuration of ACK/NACK PUCCH transmission resources, higher layer (RRC) control signaling may be used. Alternatively, candidate resources reserved through higher layer (RRC) control signaling may be configured and resources to be used for transmission among candidate resources reserved through an unused specific field of a DL grant PDCCH may be explicitly designated.

Next, when a plurality of UL CCs available for ACK/NACK transmission of a corresponding UE is configured, PUCCH transmission resources may be configured as follows.

As an example, channel transmission resources for PUCCH format 1 reserved for ACK/NACK channel selection, i.e. one or more ACK/NACK transmission PUCCH resources may be configured in a PUCCH transmission PRB region of all or some of the plurality of UL CCs and information about configuration may be provided to individual UEs through higher layer (e.g. RRC) signaling. This may be called an explicit ACK/NACK channel selection resource assignment scheme.

As another example, UL ACK/NACK transmission PUCCH resources may be configured based on the number of CCEs which are a PDCCH resource configuration unit on a specific DL CC. The specific DL CC may be a DL CC linked with corresponding UL CCs or may be a DL CC configured and signaled in a higher layer (RRC) of an eNB. ACK/NACK transmission PUCCH resources corresponding in number to the PDCCH CCEs of the specific DL CC may be indexed according to CCE indexes and may be configured as a resource region for dynamic ACK/NACK resource assignment. For example, ACK/NACK transmission PUCCH transmission resources may be configured by the lowest CCE index of a DL channel assignment PDCCH. Thus, if a resource region for dynamic ACK/NACK resource assignment is configured, PUCCH transmission resources in which ACK/NACK is to be transmitted may be determined as follows. For example, if one or more DL channel assignment PDCCHs transmitted through the PDCCH transmission resource region for scheduling DL data transmission for any UE are present, ACK/NACK transmission PUCCH transmission resources may be designated by the lowest CCE index of the one or more DL channel assignment PDCCHs and all or some of the ACK/NACK transmission PUCCH transmission resources may be configured as all or some of channel selection resources of the UL CCs. If other resources are demanded for channel selection, resources for channel selection may be configured through UE-specific higher layer (RRC) signaling. Such an ACK/NACK channel selection resource assignment scheme may be called a partially implicit channel selection resource assignment scheme and 'partially implicit' means providing partially explicit elements in ACK/NACK channel selection resource assignment. Meanwhile, if explicit information is not included for ACK/NACK transmission resource assignment when channel selection is applied, this may be called a fully implicit ACK/NACK channel selection resource assignment scheme.

In PUCCH transmission resource configuration of ACK/NACK channel selection, if DL grant PDCCH transmission is performed through PDCCH transmission resources on one DL CC configured through SIB-2 linkage with one UL CC on which the PUCCH is transmitted, PUCCH transmission resources for ACK/NACK transmission may be implicitly designated by the lowest CCE index for corresponding PDCCH transmission. If ACK/NACK PUCCH transmission resources larger in number than ACK/NACK PUCCH transmission resources designated by the lowest index for PDCCH transmission should be configured for ACK/NACK channel selection, resources for ACK/NACK channel selection may be explicitly configured through UE-specific higher layer (RRC) signaling. For explicit configuration of ACK/NACK PUCCH transmission resources, higher layer (RRC) control signaling may be used. Alternatively, candidate resources reserved through higher layer (RRC) control signaling may be configured and resources to be used for transmission among candidate resources reserved through a specific unused field of a DL grant PDCCH may be explicitly designated.

It may be assumed that an ACK/NACK channel selection scheme in the case where a single UL CC is configured or multiple UL CCs are configured is designated through higher layer (RRC) signaling with respect to a certain UE. In such a situation, if the corresponding UE is power-limited (if the entire transmission power of the UE approximates to a maximum transmission power value), a single carrier mode (or transmission mode similar thereto) may be demanded to keep CM or PAPR low. In this case, a PUSCH may be scheduled to a UL CC on which ACK/NACK transmission PUCCH resources are reserved for ACK/NACK channel selection. Alternatively, the PUSCH may be scheduled to a UL CC on which the ACK/NACK transmission PUCCH resources are not reserved. In such a situation, detailed embodiments of ACK/NACK transmission and PUSCH data transmission methods will be described below.

Embodiment 4-1

Embodiment 4-1 relates to a method for piggybacking transmission of UL ACK/NACK information on a specific PUSCH resource among one or more PUSCHs scheduled in any UL subframe. In other words, when one or more PUSCHs are scheduled, ACK/NACK information to be transmitted on a scheduled PUSCH resource may be multiplexed and transmitted according to a control/data multiplexing rule without applying ACK/NACK channel selection in the corresponding UL subframe even if an ACK/NACK channel selection transmission mode is configured.

Even when a plurality of PUSCHs is scheduled, ACK/NACK information may be transmitted by piggybacking the information through one PUSCH. Determination as to on which UL CC is ACK/NACK information piggybacked through a PUSCH may be made as follows.

As a method for implicitly determining a UL CC on which ACK/NACK information is to be piggybacked, the ACK/NACK information may be piggybacked through a PUSCH on a UL CC having the lowest index among UL CCs on which the PUSCH is scheduled. The UL CC having the lowest index may be a UL CC having the lowest CC index or the lowest cell index. As another example, ACK/NACK information may be piggybacked through a PUSCH on a UL CC having the highest index among UL CCs on which the PUSCH is scheduled or through PUSCH on a UL CC determined according to an arbitrary rule. The UL CC having the highest index may be a UL CC having the highest CC index or the highest cell index.

Alternatively, ACK/NACK information may be piggybacked through a PUSCH on a UL CC configured by a higher layer as an ACK/NACK information transmission UL CC or on a UL primary CC (or anchor CC) configured by a higher layer. In some cases, a PUSCH transmission UL CC on which ACK/NACK information is to be piggybacked may be predesignated and, if piggyback transmission of ACK/NACK information is needed, the PUSCH may be scheduled on the predesignated UL CC.

Such a piggyback transmission scheme of ACK/NACK information may be applied to a situation in which ACK/NACK PUCCH transmission resources for ACK/NACK channel selection are configured through a plurality of UL CCs or may be applied to a situation in which ACK/NACK PUCCH transmission resources for channel selection are configured through a single specific UL CC. In the latter case, the PUSCH transmission UL CC on which ACK/NACK is piggybacked may be a UL CC on which ACK/NACK PUCCH transmission resources for ACK/NACK channel selection are configured.

Embodiment 4-2

In this embodiment, if a PUSCH is scheduled to a certain UL CC among a plurality of UL CCs on which ACK/NACK PUCCH transmission resources for ACK/NACK channel selection are configured, it is proposed that a subcarrier region (refer to FIG. 15) punctured when ACK/NACK is transmitted in two OFDM symbols adjacent to an RS in each slot within the corresponding PUSCH be transmitted by always performing puncturing irrespective of whether ACK/NACK is actually transmitted.

The reason why a region in which ACK/NACK mapping is scheduled on the PUSCH is always punctured is as follows. The PDSCH transmitted from an eNB is not always received by a UE. Accordingly, even when the eNB transmits the PDSCH, if the UE does not receive the PDSCH, information (e.g. data) other than ACK/NACK information may be mapped to a region in which ACK/NACK mapping is scheduled on the PUSCH. At this time, if the eNB receives the corresponding PUSCH, the eNB determines that the region in which ACK/NACK mapping is scheduled includes ACK/NACK information even if it does not include the ACK/NACK information and thus may misjudge whether PDSCH transmission is successful. Accordingly, in order to eliminate unclearness, it is desirable to always puncture a part in which ACK/NACK mapping is scheduled on the PUSCH.

Based on this, a UL CC on which ACK/NACK information is to be transmitted is determined according to a result of the above ACK/NACK channel selection and, if the PUSCH is scheduled on the UL CC, ACK/NACK modulation symbols may be mapped in the punctured subcarrier region when ACK/NACK information is piggybacked through the PUSCH.

Meanwhile, ACK/NACK transmission is not required on the UL CC on which the PUSCH is scheduled, the punctured subcarrier region may be transmitted (in a punctured state) or a prescribed code sequence which can uniquely indicate that no ACK/NACK transmission is performed in the punctured area may be mapped. The code sequence may be defined as a sequence preshared by a UL transmission entity (UE) and a UL reception entity (eNB) or the code sequence may be signaled to the UE from the eNB.

Meanwhile, when ACK/NACK PUCCH transmission resources for ACK/NACK channel selection are configured on a single UL CC, ACK/NACK information may be piggybacked and transmitted by a method similar to the above-described method even if the PUSCH is scheduled on the single UL CC.

Figure 17:
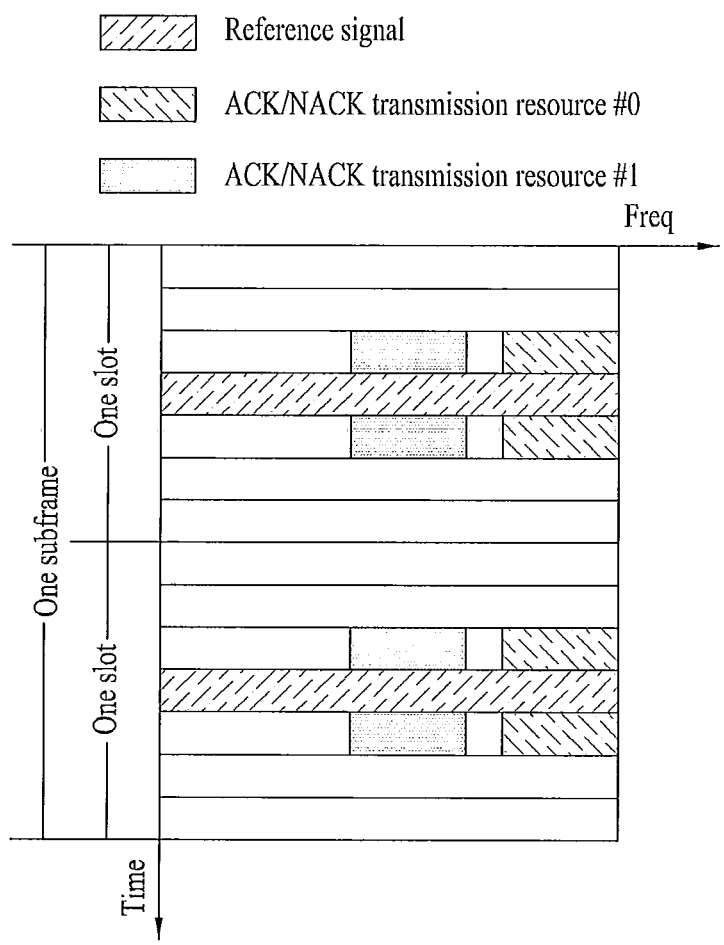
FIG. 17 is a diagram conceptually illustrating a resource assignment form for UL control information channel selection on a UL data channel resource.

FIG. 17 is a diagram conceptually illustrating resources for ACK/NACK channel selection reserved in PUSCH transmission resources transmitted on a single UL CC. If ACK/NACK channel selection described with reference to FIG. 16 is applied, an additional bit of ACK/NACK information may be expressed by reserving a plurality of PUCCH transmission resources (e.g. ACK/NACK PUCCH transmission resources #0 and #1). In this way, when PUCCH resources for ACK/NACK channel selection are reserved, if PUSCH transmission is scheduled on a corresponding UL CC, the ACK/NACK information may be piggybacked on the PUSCH and then transmitted. Here, a plurality of ACK/NACK transmission resources linked with a plurality of reserved ACK/NACK PUCCH transmission resources (e.g. ACK/NACK PUCCH transmission resources #0 and #1) may be configured in PUSCH transmission resources. That is, a plurality of distinguishable ACK/NACK transmission resources may be configured on the PUSCH resources and an additional ACK/NACK bit may be expressed by selecting one of the ACK/NACK transmission resources. For example, transmission of ACK/NACK information on ACK/NACK transmission resource #0 indicates '0' and transmission of ACK/NACK information on ACK/NACK transmission resource #1 indicates '1'. In FIG. 17, two ACK/NACK resource regions (i.e. ACK/NACK resource regions #0 and #1) configured in a PUSCH transmission resource are conceptually shown.

Accordingly, in terms of calculating the amount of ACK/NACK information piggybacked on PUSCH transmission resources of one UL CC assigned to a UE, a plurality of ACK/NACK transmission resource locations configured on the PUSCH, linked with a plurality ACK/NACK PUCCH transmission resources reserved for channel selection on the corresponding UL CC can always be punctured.

Based on this fact, when ACK/NACK information is piggybacked and transmitted on PUSCH transmission resources, ACK/NACK modulation symbols may be mapped to one of a plurality of punctured subcarrier areas (i.e. by applying ACK/NACK channel selection). A code sequence which can uniquely indicate that no ACK/NACK is transmitted may be mapped to the punctured subcarrier areas in which ACK/NACK modulation symbols are not mapped.

On the other hand, if ACK/NACK transmission is not required on a CC on which a PUSCH is scheduled, the plurality of punctured subcarrier areas may be transmitted (in a punctured state) or a code sequence which can uniquely indicate that no ACK/NACK is transmitted may be mapped to all of the punctured subcarrier areas. The code sequence may be defined as a sequence preshared by a UL transmission entity (UE) and a UL reception entity (eNB) or the code sequence may be signaled to the UE from the eNB.

Although the method for puncturing all of the PUSCH ACK/NACK transmission subcarriers linked with all of PUCCH transmission resources reserved for the ACK/NACK channel selection scheme may be basically applied, such puncturing may have an influence on PUSCH data reception capabilities. Accordingly, a multiplexing method through a compression or joint coding scheme of ACK/NACK information may be applied while puncturing PUSCH subcarriers with respect to only some of the reserved PUCCH transmission resources.

Embodiment 4-3

When a PUSCH is scheduled on any one of a plurality of UL CCs on which ACK/NACK transmission resources for ACK/NACK channel selection are configured, if ACK/NACK information is piggybacked on a PUSCH of the corresponding UL CC, an additional ACK/NACK bit expressed through ACK/NACK channel selection may not be expressed. In this case, the present embodiment proposes that ACK/NACK PUCCH transmission resources reserved for ACK/NACK channel selection for the corresponding UL CC be excluded (or disabled) in state definition for ACK/NACK channel selection and thus shortened ACK/NACK bits be piggybacked on the PUSCH transmission resources scheduled on the corresponding UL CC. Similarly, an ACK/NACK information part derived by releasing compressed expression for shortened state expression during channel selection may be piggybacked on a PUSCH. That is, if a control information bit expressed through channel selection cannot be expressed due to a situation in which channel selection cannot be applied, the corresponding control information bit may be piggybacked on the PUSCH.

For example, it is assumed that two bits of 3-bit ACK/NACK information are expressed through the PUCCH format 1b and the other one bit is expressed through channel selection for selecting one of ACK/NACK PUCCH resources #0 and #1 as described with reference to FIG. 16. If PUSCH transmission is scheduled on a UL CC on which ACK/NACK PUCCH transmission resource #0 is configured, ACK/NACK information may be piggybacked on PUSCH transmission resources according to the conventional method. However, this expresses ACK/NACK information only up to 2 bits, a 1-bit part expressed through channel selection among ACK/NACK information cannot be expressed. Accordingly, this problem can be solved by piggybacking the corresponding one-bit part on the PUSCH transmission resources by excluding ACK/NACK PUCCH resource #0 in state definition for ACK/NACK channel selection.

Meanwhile, the case in which ACK/NACK PUCCH transmission resources for ACK/NACK channel selection are configured in a single UL CC may be considered. If the PUSCH is scheduled to the corresponding UL CC, all ACK/NACK information to be fed back in a corresponding UL subframe to the corresponding PUSCH may be piggybacked on the PUSCH instead of applying ACK/NACK channel selection. Alternatively, transmission of some ACK/NACK information may be derived through PUCCH transmission to which channel selection for a PUCCH transmission resource area reserved for ACK/NACK channel selection is applied and the other ACK/NACK information may be piggybacked on the PUSCH scheduled to the corresponding UL CC.

Embodiment 4-4

In a situation in which low CM or PAPR is needed according to a UE transmission state as described previously, one specific UL CC may be designated as a UL active CC set of the corresponding UE. Here, the number of DL CCs configured in DL may be one or more (N). That is, N DL CCs and one UL CC may be configured for the UE. Then ACK/NACK information may be transmitted through a PUSCH or PUCCH in a UL subframe interval of a certain UL transmission time. In this case, a used PUCCH format may be PUCCH format 1a or 1b defined in the legacy LTE system (LTE release-8 or 9). PUCCH format 2 may also be used or a newly proposed PUCCH format may be used. In addition to ACK/NACK information transmission through the PUSCH when data to be transmitted to UL is present, the ACK/NACK information may be configured by a higher layer so as to be transmitted through the PUSCH irrespective of presence/absence of scheduled data.

UL Control Information Transmission Resource Assignment when Clustered DFT-s-OFDMA Transmission Scheme and SC-FDMA Transmission Scheme are Mixed Clustered Discrete Fourier Transform-spread-Orthogonal Frequency Division Multiple Access (DFT-s-OFDMA) refers to a transmission scheme for mitigating restriction of contiguous PRB assignment in UL while permitting higher CM or PAPR compared with a Single Carrier-Frequency Division Multiple Access (SC-FDMA) transmission scheme for demanding contiguous PRB assignment on a UL single carrier to maintain low CM or PAPR in the legacy LTE system.

As the clustered DFT-s-OFDMA transmission scheme is introduced in the LTE-A system, a situation in which an LTE-A UE supporting the clustered DFT-s-OFDMA transmission scheme and an LTE UE supporting only the conventional SC-FDMA transmission scheme are mixed may be assumed. When an LTE-A eNB transmits a channel of the LTE-A UE, the SC-FDMA transmission scheme or the DFT-s-OFDMA transmission scheme may be selectively applied according to a power-limited state. In the present invention, a transmission resource assignment method for SC-FDMA and clustered DFT-s-OFDMA transmission is proposed in UL transmission resource assignment (i.e. UL scheduling) of an eNB scheduler. For convenience of description, this method is called method 5. Detailed embodiments of the present method will be described below.

Embodiment 5-1

To optimize overall UL user throughput or cell average throughput, smooth support of restrictions of contiguous PRB assignment in an SC-FDMA transmission scheme may be an important factor for assigning a UL resource for a legacy LTE UE and an LTE-A UE to which an SC-FDMA mode is applied. A method is needed for effectively supporting a degree-of-freedom of resource assignment for SC-FDMA transmission, i.e. effectively reducing a blocking factor when an eNB scheduler assigns contiguous PRBs of a proper size for SC-FDMA transmission in a certain UL subframe.

As described above, in a situation in which the clustered DFT-S-OFDMA transmission scheme and the SC-FDMA transmission scheme are mixed, UL scheduling for the clustered DFT-s-OFDMA transmission scheme may function as a blocking factor in UL scheduling for the SC-FDMA transmission scheme. Accordingly, in eNB UL scheduling for the clustered DFT-s-OFDMA transmission scheme for assigning a plurality of PRB batches at a certain transmission time, a method may be applied for deriving PRB assignment for the resource clustered DFT-s-OFDMA transmission scheme to both band edge areas in a data transmittable subcarrier area except for a guard subcarrier interval in an IFFT size area in a certain UL CC. If prescribed scheduling restrictions are permitted, a method may be applied for assigning resources for a certain UL clustered DFT-s-OFDMA transmission to the band edge areas as nearly as possible according to a predetermined rule. For example, in a situation in which two resource clusters as reference for non-contiguous PRB assignment are configured, two distinguishable transmission PRB batches (they may be the same or different) for certain clustered DFT-s-OFDMA transmission may be assigned starting from a whole band edge within each cluster. To effectively support such a scheduling scheme, transmission resource clusters may be predefined and may be configured as a form dividing all data transmittable bands.

Embodiment 5-2

To assign a degree-of-freedom of contiguous transmission PRB assignment for SC-FDMA and at the same time to effectively support flexibility of UL scheduling which is an introduction purpose of clustered DFT-s-OFDMA, a method for separately configuring a transmission resource region for SC-FDMA transmission from a transmission resource region for clustered DFT-s-OFDMA transmission with respect to all data transmittable resource region or a method for configuring a transmission resource region for clustered DFT-s-OFDMA transmission and regarding a transmission resource region for SC-FDMA simply as entire data transmissible resource region may be considered. Especially, in the latter method, a plurality of separate PRB batches may be assigned within a resource region dedicatedly configured for a corresponding transmission scheme with respect to clustered DFT-s-OFDMA transmission and the remaining available resource region (i.e. a region in which contiguous PRB assignment is possible from the remaining resource region) after scheduling a clustered DFT-s-OFDMA transmission resource may be scheduled for a resource for certain SC-FDMA transmission.

In this embodiment, a clustered DFT-s-OFDMA transmission resource region may be configured through higher layer (e.g. RRC) signaling. A range which can designate Resource Assignment (RA) in a UL grant PDCCH DCI format for configuring a clustered DFT-s-OFDMA transmission resource may be restricted to a clustered DFT-s-OFDMA transmission resource region. In this case, an entire payload size of the UL grant DCI format of corresponding clustered DFT-s-OFDMA transmission may vary with variation of a bit size according to field configuration of the RA. However, the entire payload size of the UL grant DCI format may be designated as a fixed field size and, if a size necessary for UL scheduling is less than a fixed size, the remaining part may be bit-padded. In Embodiment 5-2, the resource assignment method of the above Embodiment 5-1 with respect to each cluster may be applied within the range of the clustered DFT-s-OFDMA transmission resource region.

Meanwhile, in the same manner that information is piggybacked through a PUSCH when transmission of control information piggybacked through a PUSCH and data information is configured on different UL CCs, a plurality of the same or different pieces of UL control information may be piggybacked on a PUSCH transmission resource and then transmitted, as a method for reducing the number of concurrently transmitted PUCCHs due to transmission power limitations of a UE in transmission of homogeneous and heterogeneous PUCCHs. For convenience of description, this method is called method 6. This method can be applied even to multiplexing of UL control information which is not defined in legacy LTE release-8/9 as well as to multiplexing of UL control information which is defined in legacy LTE release-8/9. For example, the method may be applied to the case of SR+ACK/NACK, ACK/NACK+ACK/NACK, ACK/NACK+CQI+CQI, SR+ACK/NACK+ACK/NACK, etc. Furthermore, even in a situation in which transmission of two or more PUCCHs is permitted in a multicarrier environment, the method may be applied in order to reduce the number of concurrently transmitted PUCCHs. Meanwhile, concurrent transmission during decoupling of PUSCH and PUCCH transmission on a plurality of same or different UL CCs and UL transmission during decoupling of PUCCH and PUCCH may be considered.

Figure 18:
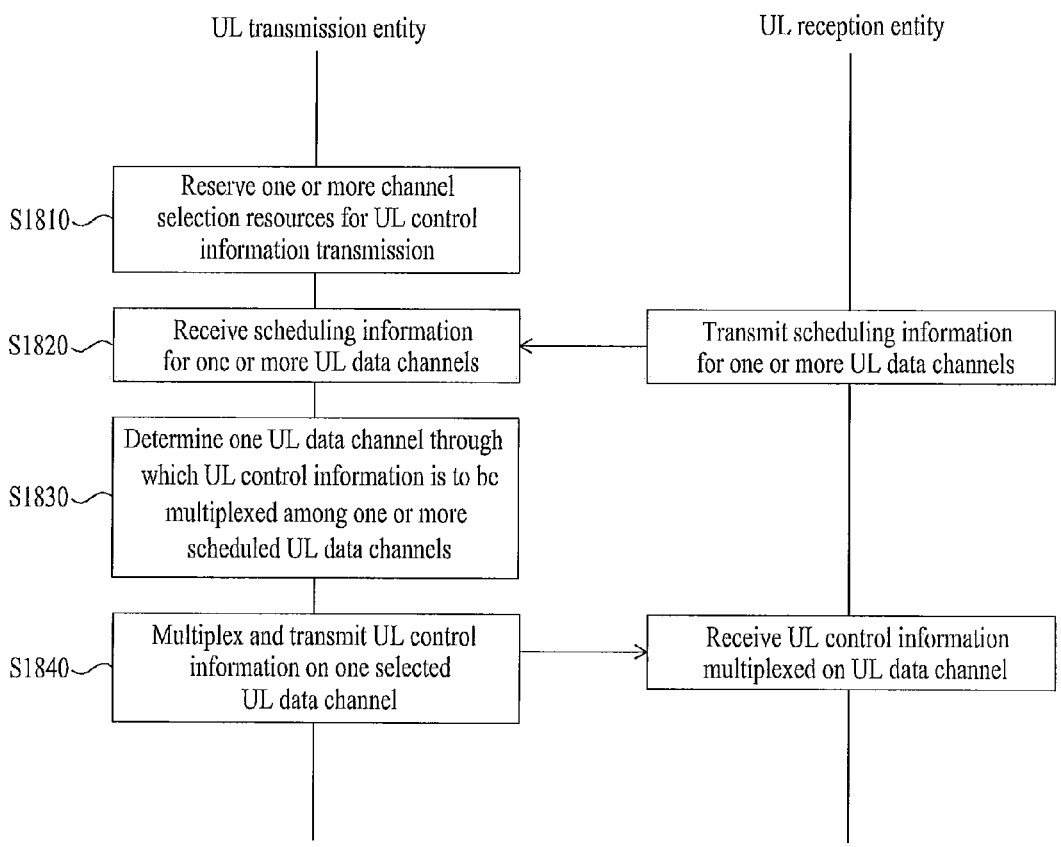
FIG. 18 is a flowchart of a UL control information transmission method in a wireless communication system supporting multiple carriers according to an exemplary embodiment of the present invention.

FIG. 18 is a flowchart of a UL control information transmission method in a wireless communication system supporting multiple carriers according to an exemplary embodiment of the present invention. In FIG. 18, a UL transmission entity may be a UE or RN and a UL reception entity may be an eNB or an RN. In the following description, the UE is described as the UL transmission entity and the eNB is described as the UL reception entity.

In step S1810, the UE may reserve one or more channel selection resources for UL control information transmission. UL control information may be, for example, ACK/NACK information corresponding to PDSCH transmission. If ACK/NACK channel selection is applied, one or more PUCCH transmission resources may be reserved as described in FIG. 16. The one or more reserved channel selection resources may be determined by higher layer signaling or may be determined based on a CCE index of a PDCCH.

In step S1820, the UE may receive scheduling information for one or more UL data channels (PUSCHs) from an eNB. The PUSCHs may be scheduled as PUSCHs transmitted in the same time domain resource as the channel selection resources reserved in step S1810. Accordingly, the UL control information may be piggybacked on PUSCH resources rather than the PUCCH transmission resources.

In step S1830, the UE may determine one UL data channel through which the UL control information is to be multiplexed (i.e. piggybacked) among the one or more scheduled UL data channels. One UL data channel through which the UL control information is multiplexed may be determined by higher layer signaling or may be determined based on an index of a UL carrier on which one or more UL data channels are scheduled.

In step S1840, the UE may multiplex and transmit the UL control information on the one selected UL data channel. A resource element region onto the PUSCH on which the UL control information is multiplexed (or mapped) may be configured as a distinguishable resource element region corresponding to each of the one or more PUCCH channel selection resources reserved for UL control information transmission similar to the description of FIG. 17. The PUSCH resource element region in which the UL control information is to be multiplexed may be punctured and the UL control information may be mapped to the punctured resource element region. If the UL control information is not transmitted, a sequence indicating that the UL control information is not transmitted may be mapped to the punctured resource element region.

The above various embodiments (especially, the embodiments related to method 4 of the present invention) of the present invention except for the description in association with FIG. 18 may be identically applied to the method for piggybacking the UL control information to which channel selection is applied on the PUSCH resource element and repeated parts are omitted for clarity of description.

Figure 19:
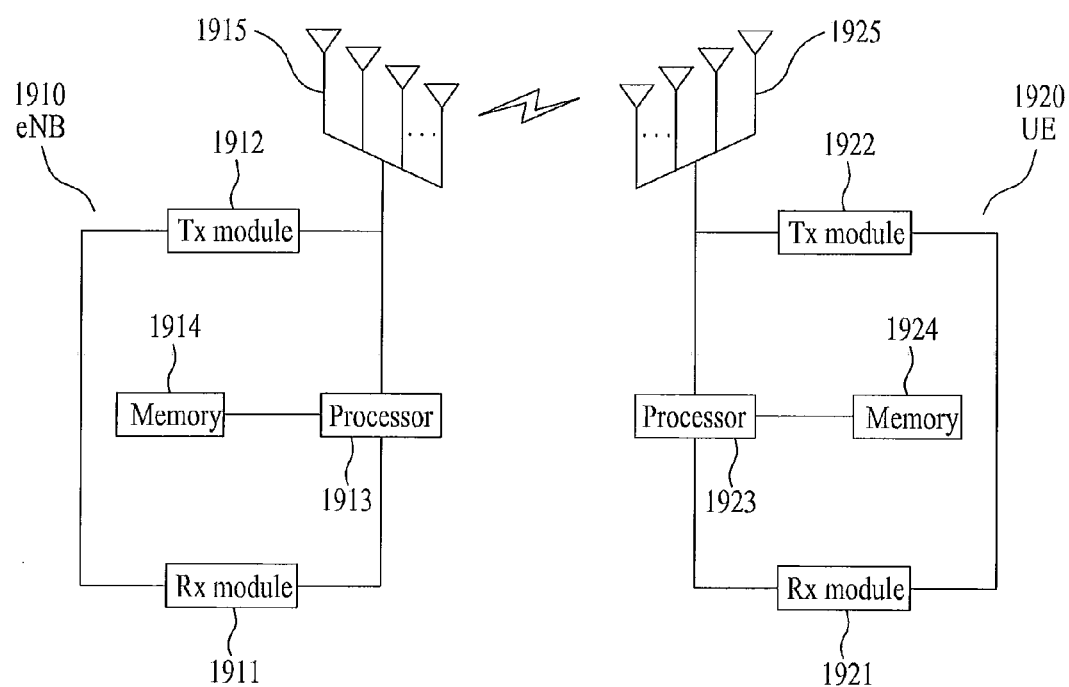
FIG. 19 is a diagram illustrating the configuration of an exemplary embodiment of an eNB and a UE according to the present invention.

FIG. 19 is a diagram illustrating the configuration of an exemplary embodiment of an eNB 1910 and a UE 1920 according to the present invention.

Referring to FIG. 19, the eNB 1910 according to the present invention may include a reception (Rx) module 1911, a transmission (Tx) module 1912, a processor 1913, a memory 1914, and a plurality of antennas 1915. The plurality of antennas 1915 refers to an eNB supporting MIMO Tx/Rx. The Rx module 1911 may receive various signals, data and information of UL from a UE. The Tx module 1912 may transmit various signals, data, and information of DL to the UE. The processor 1913 may control overall operation of the eNB 1910.

The eNB 1910 according to an exemplary embodiment of the present invention may operate in a wireless communication system supporting multiple carriers and may be configured to receive UL control information from the UE. The processor 1913 of the eNB 1910 may be configured to transmit scheduling information for one or more UL data channels through the Tx module 1912. In addition, the processor 1913 of the eNB 1910 may be configured to receive the UL control information multiplexed on one UL data channel among the one or more UL data channels through the Rx module 1911. The UL control information received by the eNB 1910 may be multiplexed in resource element regions on the one UL data channel, corresponding to each of one or more channel selection resources reserved for UL control information transmission. The one or more UL data channels received by the eNB 1910 may be scheduled in the same time domain as the one or more channel selection resources reserved for UL control information transmission.

The processor 1913 of the eNB 1910 performs an operational processing function upon information received by the eNB 1910 and information to be transmitted to the outside. The memory 1914 may store the operationally processed information for a predetermined time and may be replaced with a constituent element such as a buffer (not shown).

With reference to FIG. 19, the UE 1920 according to the present invention may include an Rx module 1921, a Tx module 1922, a processor 1923, a memory 1924, and a plurality of antennas 1925. The plurality of antennas 1925 refers to a UE supporting MIMO Tx/Rx. The Rx module 1921 may receive various signals, data, and information of DL from an eNB. The Tx module 1922 may transmit various signals, data, and information of UL to the eNB. The processor 1923 may control overall operation of the UE 1920.

The UE 1920 according to an exemplary embodiment of the present invention may operate in a wireless communication system supporting multiple carriers and may be configured to transmit UL control information to the eNB. The processor 1923 of the UE 1920 may be configured to reserve one or more channel selection resources for UL control information transmission. The processor 1923 of the UE 1920 may be configured to receive scheduling information for one or more UL data channels to be transmitted in the same time domain resources as the reserved channel selection resources through the Rx module 1921. In addition, the processor 1923 of the UE 1920 may be configured to receive scheduling information for one or more UL data channels to be transmitted in the same time region resources as the reserved channel selection resources through the Rx module 1921. The processor 1923 of the UE 1920 may be configured to determine one UL data channel through which the UL control information is to be multiplexed among the one or more UL data channels. The processor 1923 of the UE 1920 may be configured to transmit, through the Tx module 1922, the UL control information in one or more resource element regions corresponding to one or more channel selection resources reserved for UL control information transmission on the one selected UL data channel.

The processor 1923 of the UE 1920 performs an operational processing function upon information received by the UE 1920 and information to be transmitted to the outside. The memory 1924 may store the operationally processed information for a predetermined time and may be replaced with a constituent element such as a buffer (not shown).

The following description may be commonly applied when UL control information is transmitted from the UE 1920 to the eNB 1910 in a wireless communication system supporting multiple carriers. One UL data channel through which UL control information is multiplexed may be determined by higher layer signaling or may be determined based on an index of a UL carrier on which the one or more UL data channels are scheduled. In addition, the one or more reserved channel selection resources may be determined by higher layer signaling or may be determined based on a CCE index of a PDCCH. One or more resource element regions corresponding to one or more channel selection resources reserved for UL control information transmission may be punctured in one UL data channel through which the UL control information is multiplexed. The UL control information may be mapped to the punctured resource element region or a sequence indicating that the UL control information is not transmitted may be mapped to the punctured resource element region.

The detailed configuration of the above eNB and UE may be implemented such that the contents described in the above various embodiments of the present invention (i.e. the detailed embodiments for the methods for multiplexing (piggybacking) UL control information in UL data channel resources when resource assignment for channel selection for UL control information (especially, ACK/NACK information corresponding to DL transmission) is applied in the present invention) may be identically applied.

In the description of FIG. 19, the description related to the eNB 1910 may be identically applied to an RN as a DL transmission entity or UL reception entity and the description related to the UE 1920 may be identically applied to an RN as a DL reception entity or UL transmission entity.

The embodiments of the present invention may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via a variety of well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention as described above may be applied to various mobile communication systems supporting multiple carriers.

The invention claimed is:

1. A method for transmitting uplink control information in a wireless communication system supporting multiple carriers, the method comprising:
   reserving one or more channel selection resources for transmission of the uplink control information;
   receiving scheduling information for one or more uplink data channels, wherein the one or more uplink data channels are scheduled to be transmitted in the same time domain resources as the reserved channel selection resources;
   determining one uplink data channel on which the uplink control information is multiplexed, among the one or more uplink data channels;
   puncturing one or more resource element regions of the one or more uplink data channels, wherein the one or more resource element regions correspond respectively to the one or more channel selection resources reserved for transmission of the uplink control information on the one unlink data channel; and
   multiplexing the uplink control information in the punctured resource element regions on the determined one uplink data channel, and transmitting the multiplexed uplink control information,
   wherein the unlink control information is mapped to at least a portion of the punctured resource element regions, and a sequence indicating that the unlink control information is not transmitted is mapped to a remaining portion of the punctured resource element regions.

2. The method of claim 1, wherein the one uplink data channel on which the uplink control information is multiplexed is determined by higher layer signaling or is determined based on an index of an uplink carrier on which the one or more uplink data channels are scheduled.

3. The method of claim 1, wherein the one or more reserved channel selection resources are determined by higher layer signaling or are determined based on a control channel element index of a Physical Downlink Control Channel (PDCCH).

4. The method of claim 1, wherein the uplink control information is Acknowledgement/Negative Acknowledgement (ACK/NACK) information for one or more downlink data channels.

5. A method for receiving uplink control information in a wireless communication system supporting multiple carriers, the method comprising:
   transmitting scheduling information for one or more uplink data channels; and
   receiving the uplink control information multiplexed on one uplink data channel among the one or more uplink data channels,
   wherein one or more resource element regions of the one or more uplink data channels are punctured,
   wherein the one or more resource element regions correspond respectively to the one or more channel selection resources reserved for transmission of the uplink control information on the one uplink data channel,
   wherein the uplink control information is multiplexed in the punctured resource element regions on the one uplink data channel,
   wherein the one or more uplink data channels are scheduled in the same time domain resources as the one or more channel selection resources reserved for transmission of the uplink control information, and
   wherein the uplink control information is mapped to at least a portion of the punctured resource element regions, and a sequence indicating that the uplink control information is not transmitted is mapped to a remaining portion of the punctured resource element regions.

6. The method of claim 5, wherein the one uplink data channel on which the uplink control information is multiplexed is determined by higher layer signaling or is determined based on an index of an uplink carrier on which the one or more uplink data channels are scheduled.

7. The method of claim 5, wherein the one or more reserved channel selection resources are determined by higher layer signaling or are determined based on a control channel element index of a Physical Downlink Control Channel (PDCCH).

8. The method of claim 5, wherein the uplink control information is Acknowledgement/Negative Acknowledgement (ACK/NACK) information for one or more downlink data channels.

9. A user equipment for transmitting uplink control information in a wireless communication system supporting multiple carriers, the user equipment comprising:
- a reception module configured to receive a downlink signal;
- a transmission module configured to transmit an uplink signal; and
- a processor connected to the reception module and the transmission module, for controlling operation of the user equipment, and configured to:
  - reserve one or more channel selection resources for transmission of the uplink control information,
  - receive, through the reception module, scheduling information for one or more uplink data channels, wherein the one or more uplink data channels are scheduled to be transmitted in the same time domain resources as the reserved channel selection resources,
  - determine one uplink data channel on which the uplink control information is multiplexed, among the one or more uplink data channels,
  - puncture one or more resource element regions of the one or more uplink data channels, wherein the one or more resource element regions correspond respectively to the one or more channel selection resources reserved for transmission of the uplink control information on the one uplink data channel, and
  - multiplex the uplink control information in the punctured resource element regions on the determined one uplink data channel, and transmit the multiplexed uplink control information through the transmission module,
- wherein the uplink control information is mapped to at least a portion of the punctured resource element regions, and a sequence indicating that the uplink control information is not transmitted is mapped to a remaining portion of the punctured resource element regions.

10. A base station for receiving uplink control information in a wireless communication system supporting multiple carriers, the base station comprising:
- a reception module configured to receive an uplink signal;
- a transmission module configured to transmit a downlink signal; and
- a processor connected to the reception module and the transmission module, for controlling operation of the base station, and configured to:
  - transmit scheduling information for one or more uplink data channels through the transmission module, and
  - receive the uplink control information multiplexed on one uplink data channel among the one or more uplink data channels through the reception module,
- wherein one or more resource element regions of the one or more uplink data channels are punctured,
- wherein the one or more resource element regions correspond respectively to the one or more channel selection resources reserved for transmission of the unlink control information on the one unlink data channel,
- wherein the uplink control information is multiplexed in the punctured resource element regions on the one uplink data channel,
- wherein the one or more uplink data channels are scheduled in the same time domain resources as the channel selection resources reserved for transmission of the uplink control information, and
- wherein the uplink control information is mapped to at least a portion of the punctured resource element regions, and a sequence indicating that the uplink control information is not transmitted is mapped to a remaining portion of the punctured resource element regions.

* * * * *